(12) United States Patent
Payal et al.

(10) Patent No.: US 12,242,670 B2
(45) Date of Patent: Mar. 4, 2025

(54) AUDIO AND HAPTIC SIGNAL PROCESSING

(71) Applicant: QUALCOMM Incorporated, San Diego, CA (US)

(72) Inventors: Shreyas Srikanth Payal, Carlsbad, CA (US); Sandeep Louis D'Souza, San Diego, CA (US); Reid Westburg, Del Mar, CA (US); William Scofield, San Diego, CA (US); George Issa Saman, San Diego, CA (US); Hui-Ya Liao Nelson, San Diego, CA (US); Hocine Merabti, San Diego, CA (US); Matthew Zivney, San Diego, CA (US); Eddie Choy, Carlsbad, CA (US); Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/880,508

(22) Filed: Aug. 3, 2022

(65) Prior Publication Data

US 2024/0045505 A1    Feb. 8, 2024

(51) Int. Cl.
  *G06F 3/01* (2006.01)
  *G06F 3/16* (2006.01)
  *G08B 6/00* (2006.01)

(52) U.S. Cl.
  CPC ............... *G06F 3/016* (2013.01); *G06F 3/16* (2013.01); *G08B 6/00* (2013.01)

(58) Field of Classification Search
  CPC .............. G08B 6/00; G06F 3/016; G06F 3/16
  (Continued)

(56) References Cited

U.S. PATENT DOCUMENTS

| | | | | |
|---|---|---|---|---|
| 5,669,818 | A | * | 9/1997 | Thorner .................... G09B 9/05 463/47 |
| 6,285,351 | B1 | * | 9/2001 | Chang ...................... G06F 3/011 345/161 |

(Continued)

FOREIGN PATENT DOCUMENTS

EP    3040810 A1    7/2016

OTHER PUBLICATIONS

International Search Report and Written Opinion—PCT/US2023/067682—ISA/EPO—Sep. 28, 2023.

*Primary Examiner* — Jack K Wang
(74) *Attorney, Agent, or Firm* — QUALCOMM Incorporated

(57) ABSTRACT

Audio and haptic signal processing systems and methods are provided. There is provided a method for haptic drive signal generation. The method comprises receiving an input audio signal for driving an audio speaker. The method further comprises deriving, from the audio signal, data components indicative of behaviour of the audio speaker when being driven by the input audio signal, each data component being associated with a respective frequency range. The method further comprises determining a haptic drive component from each data component. A gain is selected to provide to each of the haptic drive components, the gain being selected for each respective frequency range. Each selected gain is applied to the respective haptic drive component to produce gain adjusted haptic drive components. A haptic drive signal is determined from the gain adjusted haptic drive components, the haptic drive signal being so as to produce a mechanical behaviour of the haptic actuator when the haptic drive signal is used to drive the haptic actuator.

42 Claims, 12 Drawing Sheets

(58) Field of Classification Search
USPC .................................................. 340/407.1
See application file for complete search history.

(56) References Cited

U.S. PATENT DOCUMENTS

| | | | | |
|---|---|---|---|---|
| 7,979,146 B2* | 7/2011 | Ullrich | .................... | G06F 3/016 |
| | | | | 340/407.1 |
| 8,717,152 B2* | 5/2014 | Bhatia | .................... | G06F 3/016 |
| | | | | 340/407.1 |
| 8,860,563 B2* | 10/2014 | Cruz-Hernandez | ..... | G06F 3/016 |
| | | | | 340/407.1 |
| 11,069,206 B2* | 7/2021 | Rao | ................. | G06F 3/016 |
| 11,606,636 B2* | 3/2023 | Lin | ................. | G10L 21/06 |
| 2016/0027264 A1* | 1/2016 | Choi | ................. | G08B 6/00 |
| | | | | 340/407.1 |
| 2018/0321748 A1 | 11/2018 | Rao et al. | | |
| 2019/0227628 A1* | 7/2019 | Rand | ................. | G06F 3/167 |
| 2019/0311590 A1* | 10/2019 | Doy | ................. | H03F 3/183 |
| 2019/0340895 A1 | 11/2019 | Rao et al. | | |
| 2021/0052980 A1 | 2/2021 | Lindemann et al. | | |
| 2021/0150865 A1 | 5/2021 | Valanarasu et al. | | |
| 2022/0392318 A1* | 12/2022 | Lin | ................. | H04R 1/08 |

* cited by examiner

AUDIO AND HAPTIC SIGNAL PROCESSING

TECHNICAL FIELD

The disclosure relates to haptic feedback generation. In particular, the disclosure relates to methods and systems for generating a haptic drive signal for driving a haptic actuator, the haptic drive signal being generated based on an audio signal for driving an audio speaker.

BACKGROUND

Haptic feedback, or haptic technology, kinaesthetic communication, 3D touch etc., refers to the use of vibrations (or in some cases forces or motions) to simulate an experience of touch for a user. Haptic feedback is commonly used in devices such as mobile phones, game controllers, joysticks and steering wheels, where parts of the device are configured to vibrate in order to improve a perceived user experience. Haptic technology is also used in virtual, augmented and extended reality applications, for example in creating or controlling virtual objects and enhancing remote control of devices. Haptic feedback also finds application in wearable technology and the Internet of Things (IOT), again to improve user experience or control of devices.

In cases such as mobile phone and gaming applications, user experience is often improved by linking haptic feedback with audio output. For realistic and immersive user-experience, the acoustic output of the speaker should often be consistent with the output vibration—i.e., the haptic response. Further, particular haptic responses may improve user experience to a greater extent than others, and so tailored haptic responses may be desirable.

However, it can be challenging to maintain consistency between audio output and haptic response, particularly when attempting to provide certain haptic responses across multiple devices which may have different speakers/haptic actuators having different properties and/or different geometric placements of the speakers and haptic actuators, which thus may respond differently to different audio and haptic signaling.

SUMMARY OF DISCLOSURE

The following presents aspects to improve upon the existing techniques and systems for haptic drive signal generation, disclosure to at least improve consistency between the audio output and the haptic response. This consistency may include providing a haptic drive signal that closely corresponds to the audio output signal, both in terms of time synchronisation between signals (so that a particular audio output is synchronised in time with a haptic output) and the profiles of the signals (so that the actual haptic signal perceived is consistent with the audio output). This consistency provided by disclosure these aspects may be independent of the particular audio speaker and/or haptic actuator being used, and independent of the particular haptic signal being generated—in other words, tailored haptic signals can be generated (e.g. where certain frequency components are emphasised for haptic response, as discussed further herein) for a given audio signal depending on the use case, all of which provide a user experience that is consistent with the audio signal, regardless of the particular type of speaker or actuator being used.

According to a first aspect embodiments provide a method for haptic drive signal generation. The method comprises receiving an input audio signal for driving an audio speaker. The method further comprises deriving, from the audio signal, data components indicative of behaviour of the audio speaker when being driven by the input audio signal, each data component being associated with a respective frequency range. The method further comprises determining a haptic drive component from each data component. A gain is selected to provide to each of the haptic drive components, the gain being selected for each respective frequency range. Each selected gain is applied to the respective haptic drive component to produce gain adjusted haptic drive components. A haptic drive signal is determined from the gain adjusted haptic drive components, the haptic drive signal being so as to produce a mechanical behaviour of the haptic actuator when the haptic drive signal is used to drive the haptic actuator.

Optionally, each data component is indicative of a mechanical behaviour of the audio speaker when being driven by the audio signal across the respective frequency range.

The data components may be indicative of speaker excursion, speaker acceleration or speaker output acoustic pressure level when the audio speaker is driven by the input audio signal.

The deriving of the data components may comprise predicting the mechanical behaviour of the audio speaker when being driven by the audio signal; and determining the data components from the prediction of the mechanical behaviour.

The predicting may comprise inputting the audio signal into a model of the mechanical behaviour of the audio speaker, the model configured to generate a prediction of the mechanical behaviour of the audio speaker when driven by the audio signal input into the model. The predicting may further comprise adjusting one or more parameters of the model based on operational feedback from the audio speaker. The operational feedback may comprise voltage and/or current feedback from the audio speaker. Determining the data components from the prediction of the mechanical behaviour may comprise filtering the prediction of the mechanical behaviour according to audio frequency, the prediction of the mechanical behaviour being filtered into the data components.

Determining a haptic drive component from each data component may comprise applying a moving average, or other digital signal processing such as finite impulse response (FIR) or infinite impulse response (IIR) filters to each data component to produce a respective haptic drive component.

The gain to provide to each of the haptic drive components may be selectable by a user. The gain to provide to each of the haptic drive components may be selectable by a user through a graphical user interface, GUI.

Each haptic drive component may be indicative of a mechanical behaviour of the haptic actuator when driven by a haptic drive signal determined from the respective haptic drive component. Determining a haptic drive signal from the gain adjusted haptic drive components may comprise determining, from the gain adjusted haptic drive components, the haptic drive signal to produce the mechanical behaviour of the haptic actuator indicated by the gain adjusted haptic drive components. Determining, from the gain adjusted haptic drive components, the haptic drive signal may comprise inputting the gain adjusted haptic drive components into a model of the mechanical behaviour of the haptic actuator, the model configured to generate a haptic drive signal that will recreate the mechanical behaviour indicated by the gain adjusted haptic drive components when used to drive the haptic actuator. Determining, from the gain adjusted haptic drive components, the haptic drive signal may further comprise adjusting one or more parameters of the model based on operational feedback from the haptic actuator. The operational feedback may comprise voltage and/or current feedback from the haptic actuator. In other words, the produced mechanical behaviour may be desired mechanical behaviour which corresponds to the gain adjusted haptic drive components. The gain adjusted haptic drive components may represent the mechanical behaviour desired to be produced by the haptic actuator. In this case, the haptic drive signal is determined from the gain adjusted drive components as a drive signal that will produce the desired mechanical behaviour in the haptic actuator as indicated by the gain adjusted drive components.

Providing gains to the haptic drive components may be based on the frequency ranges associated with the haptic drive components. A first haptic drive components may be associated with a first frequency range component and a second haptic drive component associated with a second frequency range. The first frequency range may be a lower frequency range than the second frequency range. Providing gains to the haptic drive components based on the frequency ranges associated with the haptic drive components may here comprise providing a higher gain to the first haptic drive component associated with the first frequency range component than the gain provided to the second haptic drive component associated with the second frequency range. The gain provided to the second haptic drive component may be a zero gain.

The method may further comprise: synchronizing the audio output of the audio speaker with the haptic output of the haptic actuator. The synchronizing may comprise: generating an audio output from the audio speaker using an input audio signal that includes a pilot input signal (the pilot tone may be the input signal, or may be included as a part of the audio signal—e.g. embedded in the signal along with other audio data) and receiving a speaker response signal from the audio speaker in response to the generated audio output; generating a haptic output from the haptic actuator using a pilot input signal and receiving a haptic response signal from the haptic actuator in response to the generated haptic output; determining a time-delay from the speaker response signal and the haptic response signal; and adjusting input audio signals to the audio speaker and input haptic signals to the haptic actuator so as to adjust the time-delay.

According to the aspect embodiments also provide a system for haptic drive signal generation comprising one or more processors configured to receive an input audio signal for driving an audio speaker. The one or more processors are further configured to derive, from the audio signal, data components indicative of behavior of the audio speaker when being driven by the input audio signal, each data component being associated with a respective frequency range; determine a haptic drive component from each data component; select a gain to provide to each of the haptic drive components, the gain being selected for each respective frequency range; apply each selected gain to the respective haptic drive component to produce gain adjusted haptic drive components; and determine a haptic drive signal from the gain adjusted haptic drive components, the haptic drive signal being so as to produce a mechanical behavior of the haptic actuator when the haptic drive signal is used to drive the haptic actuator.

Optionally, each data component is indicative of a mechanical behaviour of the audio speaker when being driven by the audio signal across the respective frequency range.

The data components may be indicative of speaker excursion, speaker acceleration or speaker output acoustic pressure level when the audio speaker is driven by the input audio signal.

The deriving of the data components may comprise predicting the mechanical behaviour of the audio speaker when being driven by the audio signal; and determining the data components from the prediction of the mechanical behaviour.

The predicting may comprise inputting the audio signal into a model of the mechanical behaviour of the audio speaker, the model configured to generate a prediction of the mechanical behaviour of the audio speaker when driven by the audio signal input into the model. The predicting may further comprise adjusting one or more parameters of the model based on operational feedback from the audio speaker. The operational feedback may comprise voltage and/or current feedback from the audio speaker. Determining the data components from the prediction of the mechanical behaviour may comprise filtering the prediction of the mechanical behaviour according to audio frequency, the prediction of the mechanical behaviour being filtered into the data components.

Determining a haptic drive component from each data component may comprise applying a moving average, or other digital signal processing such as finite impulse response (FIR) or infinite impulse response (IIR) filters to each data component to produce a respective haptic drive component.

The gain to provide to each of the haptic drive components may be selectable by a user. The gain to provide to each of the haptic drive components may be selectable by a user through a graphical user interface, GUI.

Each haptic drive component may be indicative of a mechanical behaviour of the haptic actuator when driven by a haptic drive signal determined from the respective haptic drive component. Determining a haptic drive signal from the gain adjusted haptic drive components may comprise determining, from the gain adjusted haptic drive components, the haptic drive signal to produce the mechanical behaviour of the haptic actuator indicated by the gain adjusted haptic drive components. Determining, from the gain adjusted haptic drive components, the haptic drive signal may comprise inputting the gain adjusted haptic drive components into a model of the mechanical behaviour of the haptic actuator, the model configured to generate a haptic drive signal that will recreate the mechanical behaviour indicated by the gain adjusted haptic drive components when used to drive the haptic actuator. Determining, from the gain adjusted haptic drive components, the haptic drive signal may further comprise adjusting one or more parameters of the model based on operational feedback from the haptic actuator. The operational feedback may comprise voltage and/or current feedback from the haptic actuator. In other words, the produced mechanical behaviour may be desired mechanical behaviour which corresponds to the gain adjusted haptic drive components. The gain adjusted haptic drive components may represent the mechanical behaviour desired to be produced by the haptic actuator. In this case, the haptic drive signal is determined from the gain adjusted drive components as a drive signal that will produce the desired mechanical behaviour in the haptic actuator as indicated by the gain adjusted drive components.

Providing gains to the haptic drive components may be based on the frequency ranges associated with the haptic drive components. A first haptic drive components may be associated with a first frequency range component and a second haptic drive component associated with a second frequency range. The first frequency range may be a lower frequency range than the second frequency range. Providing gains to the haptic drive components based on the frequency ranges associated with the haptic drive components may here comprise providing a higher gain to the first haptic drive component associated with the first frequency range component than the gain provided to the second haptic drive component associated with the second frequency range. The gain provided to the second haptic drive component may be a zero gain.

The one more processors of the system may be further configured to: synchronize the audio output of the audio speaker with the haptic output of the haptic actuator. The synchronizing may comprise: generating an audio output from the audio speaker using an input audio signal that includes a pilot input signal (the pilot tone may be the input signal, or may be included as a part of the audio signal—e.g. embedded in the signal along with other audio data) and receiving a speaker response signal from the audio speaker in response to the generated audio output; generating a haptic output from the haptic actuator using a pilot input signal and receiving a haptic response signal from the haptic actuator in response to the generated haptic output; determining a time-delay from the speaker response signal and the haptic response signal; and adjusting input audio signals to the audio speaker and input haptic signals to the haptic actuator so as to adjust the time-delay.

The system may further comprise a memory connected to the one or more processors. The system may further comprise the audio speaker and/or the haptic actuator, the audio speaker and/or the haptic actuator being connected to the one or more processor.

According to the aspect embodiments also provide a computer-readable medium comprising instructions that when executed cause one or more circuits of a device for processing data to carry out any of the steps of the method of the aspect.

According to a second aspect embodiments provide a method of haptic drive signal generation, the method comprising: receiving an input audio signal for driving an audio speaker; determining, based on the audio signal, a signal indicative of a mechanical behavior of the audio speaker when being driven by the audio signal; and determining a haptic drive signal for a haptic actuator from the signal indicative of the mechanical behavior of the audio speaker.

According to the second aspect embodiments provide a system for haptic drive signal generation, the system comprising one or more processors configured to: receive an input audio signal for driving an audio speaker; determine, based on the audio signal, a signal indicative of a mechanical behavior of the audio speaker when being driven by the audio signal; and determine a haptic drive signal for a haptic actuator from the signal indicative of the mechanical behavior of the audio speaker.

According to a third aspect embodiments provide a method of synchronizing audio output of an audio speaker with haptic output of a haptic actuator, the method comprising: generating an audio output from an audio speaker using an input audio signal including a pilot input signal and receiving a speaker response signal from the audio speaker in response to the generated audio output; generating a haptic output from a haptic actuator using a pilot input signal and receiving a haptic response signal from the haptic actuator in response to the generated haptic output; determining a time-delay from the speaker response signal and the haptic response signal; and adjusting input audio signals to the audio speaker and input haptic signals to the haptic actuator so as to adjust the time-delay.

According to the third aspect embodiments provide a system for synchronizing audio output of an audio speaker with haptic output of a haptic actuator, the system comprising one or more processors configured to: generate an audio output from an audio speaker using a pilot input signal and receiving a speaker response signal from the audio speaker in response to the generated audio output; generate a haptic output from a haptic actuator using a pilot input signal and receiving a haptic response signal from the haptic actuator in response to the generated haptic output; determine a time-delay from the speaker response signal and the haptic response signal; and adjust input audio signals to the audio speaker and input haptic signals to the haptic actuator so as to adjust the time-delay.

According to further aspects embodiments provide a computer readable medium having instructions thereon configured to cause one or more processors to perform the methods of any one of the first, second or third aspects.

Where functional modules or units are referred to in apparatus embodiments for carrying out various functions, or steps of the described method(s), it will be understood that these modules or units may be implemented in hardware, in software, or a combination of the two. When implemented in hardware, the modules may be implemented as one or more hardware modules, such as one or more application specific integrated circuits (ASICs), or field programmable gate arrays (FPGAs). When implemented in software, the modules may be implemented as one or more computer programs that are executed on one or more processors.

BRIEF DESCRIPTION OF THE DRAWINGS

The accompanying drawings are presented to aid in the description of various aspects of thereof.

DETAILED DESCRIPTION OF THE DRAWINGS

The present disclosure will first provide a description of the main components of an exemplary system for implementing the aspects of the present disclosure. Discussion will then turn to a further aspect of the disclosure before turning to specific exemplary embodiments implementing the aspects of the disclosure, along with additional discussion of details for implementing the embodiments considered herein. Alternate aspects may be devised without departing from the scope of the disclosure. Additionally, well-known elements of the disclosure will not be described in detail or will be omitted so as not to obscure the relevant details of the disclosure.

Haptic Signal Generation

Figure 1:
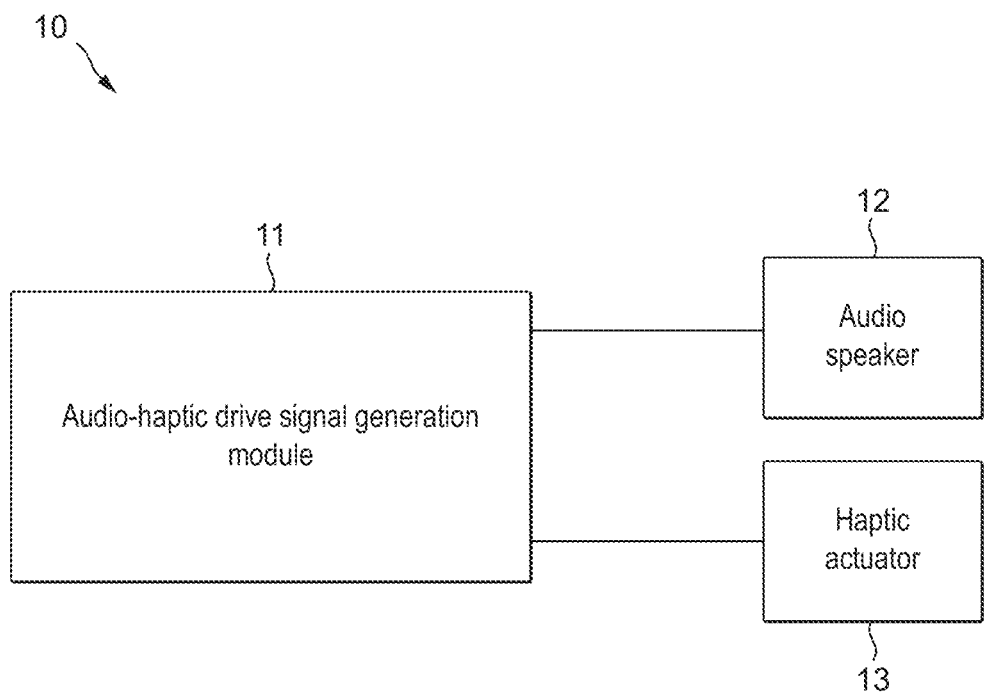
FIG. 1 is a schematic representation of an exemplary system for implementing aspects of the disclosure.

Referring to FIG. 1, a schematic representation is shown of the main components of an exemplary system 10 for implementing aspects of the present disclosure. The system 10 is a system for haptic drive signal generation comprising an audio-haptic drive signal generation module 11, which may be a general processing unit. This processing module 11 may be implemented in hardware or software and may comprise, for example, one or more processors and a memory connected thereto configured to perform the various method steps for generating the haptic drive signal, as will be discussed in detail below.

The system 10 further comprises an audio speaker 12 and a haptic actuator 13, such as a linear resonant actuator (LRA), piezoelectric resonator or any other suitable haptic actuator. Whilst the system 10 has been shown as comprising the audio speaker 12 and haptic actuator 13 for ease of discussion, it will be appreciated that the aspects of the disclosure is not limited to a system including the speaker 12 and the actuator 13. For example, the system may comprise the audio-haptic drive signal generation module 11 only, which may then be connected to a separate audio speaker (or multiple audio speakers as appropriate) and a separate haptic actuator (or multiple haptic actuators as appropriate). The audio speaker is connected to the audio-haptic drive signal generation module such that the audio-haptic drive signal generation module can pass an audio signal to the audio speaker to drive the audio speaker and the audio speaker can pass signals back to the audio-haptic drive signal generation module, for example feedback signals. The audio signal here is an electronic signal that can be converted by the audio speaker into a corresponding audio output. As will be discussed in more detail in relation to FIG. 13, in some embodiments, the audio signal, which on output from the audio-haptic drive signal generation module is a digital signal, may be passed to an audio-amplifier (not shown in FIG. 1) to convert the digital signal to an analogue output.

The analogue audio signal is then passed to the audio speaker. In other words the audio signal may be converted from a digital format to an analogue format before being passed to the audio speaker. Similarly, the feedback signals may be passed to the audio-amplifier for conversion to a digital feedback signal, with the digital feedback signal being passed to the audio-haptic drive signal generation module. The feedback signals may for example be current or voltage signals indicative of performance characteristics of the audio speaker, as will be described further below. Similarly, the haptic actuator is connected to the audio-haptic drive signal generation module such that the audio-haptic drive signal generation module can pass haptic drive signals to the haptic actuator to drive the haptic actuator and the haptic actuator can pass signals back to the audio-haptic drive signal generation module, for example feedback signals. The haptic drive signal here is an electronic signal, for example a voltage signal, that can be converted by the haptic actuator into a corresponding haptic output. The feedback signals may for example be current or voltage signals indicative of performance characteristics of the haptic actuator, as will be described further below. As with the audio signals, in some embodiments, the haptic drive signal, which on output from the audio-haptic drive signal generation module is a digital signal, may be passed to a haptic driver circuit (not shown in FIG. 1) to convert the digital signal to an analogue output. The analogue haptic drive signal is then passed to the haptic actuator. In other words, the haptic drive signal may be converted from a digital format to an analogue format before being passed to the haptic actuator. Similarly, the feedback signals may be passed to the haptic driver circuit for conversion to a digital feedback signal, with the digital feedback signal being passed to the audio-haptic drive signal generation module.

Figure 2:
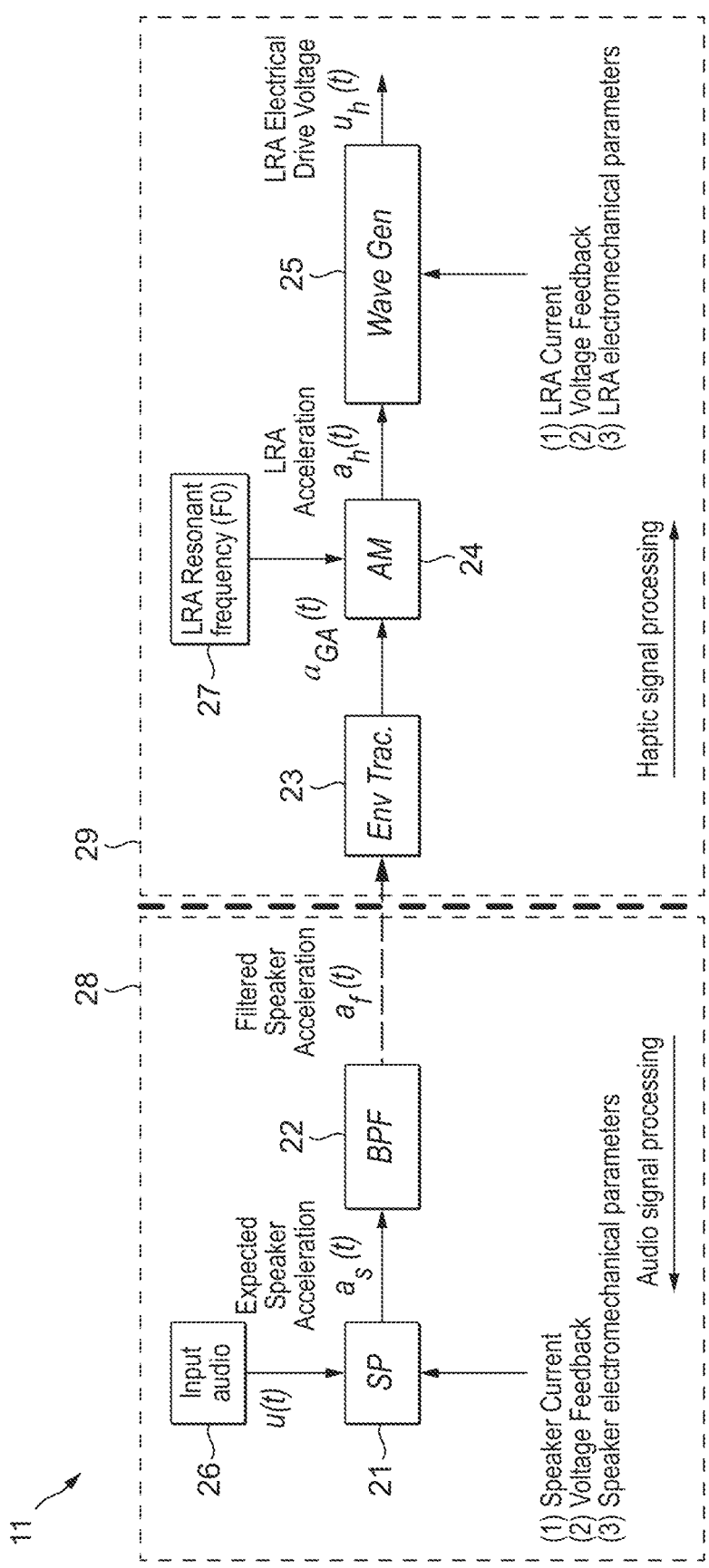
FIG. 2 is a schematic representation of an exemplary system illustrating the functional modules for implementing aspects of the disclosure.

Referring now to FIG. 2, the functional components of exemplary audio-haptic drive signal generation module 11 are shown. Each component may be implemented in software of hardware as appropriate—for example, the components may be implemented by the one or more processors of the module 11.

Audio-haptic drive signal generation module 11 comprises speaker module 21, a filter module 22, an envelope tracking module 23 (shown as Env Trac. in FIG. 2), an amplitude modulator 24 and a haptic waveform generator 25. It is noted that in certain embodiments the envelop tracking module 23 may be an audio-to-haptic conversion module—i.e. the module performs the function of audio-to-haptic conversion. In other cases, the combination of envelope tracking module 23 and the amplitude modulator may function as an audio-to-haptic conversion module. It will be appreciated that other alternatives are possible. It will be appreciated that the modules as shown in FIG. 2 are for ease of discussion, and may not represent separate components—modules may be combined or omitted depending on the embodiment and use case.

Speaker module 21 is configured to receive an input audio signal u(t) (shown in FIG. 2 by block 26) for driving an audio speaker. This is an electronic signal that when passed to audio speaker 12 is converted into an audio output by the speaker. In other words, the audio signal u(t) is an electronic signal representation of an audio output, or to put it differently, it is an electronic signal that may be used to drive an audio speaker to produce an audio output corresponding to the signal. The input audio signal u(t) may be a digital representation, such as pulse coded modulation (PCM), of a speaker drive signal. The input audio signal u(t) may be converted from a digital format to an analogue format, for example by a speaker audio-amplifier. The analogue signal may be an analogue voltage drive signal that is passed to the speaker for conversion to audio output. The audio signal u(t) may be a digital file representing a music track, a sound track for a video game or a movie, a ringtone or app alert, or any appropriate audio output. The audio signal may be stored in memory, for example the memory of the audio-haptic drive signal generation module 11 or another memory of the system as appropriate.

In the arrangement shown in FIG. 2, the speaker module 21 and the filter module 22, here a band pass filter bank (BPF), are configured to derive, from the audio signal, data components indicative of behaviour of the audio speaker when being driven by the input audio signal, each data component being associated with a respective frequency range.

In more detail, the speaker module 21 is configured to predict the mechanical behaviour of the audio speaker 12 when being driven by the audio signal. The prediction of the mechanical behaviour comprises inputting the audio signal u(t) into a model of the mechanical behaviour of the audio speaker 12. The model is configured to generate a prediction of the mechanical behaviour of the audio speaker when driven by the audio signal input into the model—i.e. the model outputs expected behaviour of the audio speaker when being driven by a given audio signal. The output is the signal (or function) $a_s(t)$ that indicates the expected mechanical behaviour of the speaker 12 when driven by the input audio signal u(t).

The speaker module 21 comprises, or has access to, the model, e.g. stored in the memory of the drive signal generation module 11, which may be the memory of speaker module 21 or a separate memory. In the present embodiment, the mechanical behaviour is the acceleration of the speaker diaphragm, which is the double derivative of the speaker excursion. It will be appreciated that other mechanical behaviour may be suitable, such as speaker excursion, or pressure output of the speaker diaphragm etc. For a given audio signal input to the speaker model 21, the model provides the speaker acceleration expected when the audio speaker is driven by the input audio signal.

The model may be defined by various predetermined electromechanical parameters of the particular audio speaker being used (the model may differ between speakers—i.e. the model may be bespoke for the particular audio speaker so as to accurately predict that particular speaker's behaviour). The electromechanical parameters include those parameters that allow the determination of speaker acceleration for any given audio input. The speaker may be represented using a parametric lumped-element model, although it will be appreciated that other models are possible. The model may be discretized into a filter, which is used to determine the output displacement for any input voltage. The parameters of the speaker are the lumped-element parameters. They describe speaker behaviour across a wide variety of input signal amplitude and across a band of frequency of interest. The following is a reference for speaker modelling: https://www.aes.org/e-lib/browse.cfm?elib=13881.

The speaker module 21 may also be configured to adjust one or more parameters of the model based on operational feedback from the audio speaker. The speaker module 21 may be configured to receive operational feedback comprising current and voltage feedback, along with speaker electromechanical parameters measured, directly from the audio speaker 12 (shown in FIG. 2 as speaker current (1), voltage feedback (2) and speaker electromechanical parameters (3)). This feedback is live feedback from the audio speaker 12 as it is being driven by an audio signal (e.g. an audio signal different from u(t)). This live feedback allows speaker module 21 to determine how the speaker is actually performing in real time, and can then adjust the model accordingly. This may allow the speaker module 21 to take account of specific—e.g. current-operating conditions experienced by the audio speaker, such as temperature, age of speaker etc. so as to provide the most accurate and up-to-date model for the speaker as possible. In one example, the current and voltage feedback may be used to derive current electromechanical parameters, which can then be used to update the parameters of the model. For example, the electromechanical parameters of the model can be adjusted to match those calculated from the feedback, which will result in the behaviour predicted by the model to match the actual behaviour of the speaker. The speaker module may be configured to update the model using feedback at a certain frequency, for example every millisecond, ten milliseconds, 100 milliseconds etc. Whilst the arrangement shown in FIG. 2 involves speaker current and voltage feedback to optimise the model, it will be appreciated that embodiments are possible which do not involve such feedback. In such embodiments the predicted behaviour is simply determined by a predetermined model set ahead of time, for example during initial set up or manufacture. If using a lumped-element model, for example, for some voltage input, and a specific lumped-element model of the speaker and some recorded sensed current, it is possible to characterize the speaker. The lumped-element parameters if updated, then represent a time-varying speaker. With knowledge of the specific models, it is possible to track the speaker parameters over time using the sensed waveforms for current/voltage.

The speaker module may also be configured to adjust the input audio based on predicted speaker behaviour, for example to protect the speaker. This may be done just using the model, i.e. without live feedback, or including live feedback. In this way the speaker module acts as a speaker protection module, for example a limiter, that prevents audio signals that would cause audio responses that could damage the speaker. For example, audio inputs that are predicted by the model to cause mechanical behaviour that may damage the speaker are modified such that the modified audio signals causes mechanical behaviour that is safe for the speaker to perform (i.e. carries a low risk of speaker damage).

Once expected speaker acceleration $a_s(t)$ is output from speaker module 21, it is passed to BPF 22. It is noted that in certain embodiments the mechanical behaviour of the speaker may not be predicted at all, in which case speaker module 21 (if present) simply passes the audio signal straight to the BPF module 22.

BPF module 22 determines the data components from the prediction of the mechanical behaviour $a_s(t)$. The determination of the data components by the BPF module 22 comprises filtering the prediction of the mechanical behaviour according to audio frequency. The prediction of the mechanical behaviour is filtered into the data components. To put it differently, the expected speaker acceleration $a_s(t)$ is passed through a filter bank that extracts the data components from the speaker acceleration $a_s(t)$ according to specific frequency bands—the data component of the speaker acceleration $a_s(t)$ associated with one audio frequency range will be organised in one filter bank, the data component of the speaker acceleration $a_s(t)$ associated with a second audio frequency range will be organised in a second filter bank etc. The term "data component" is thus being used here to refer to the portion of the speaker acceleration $a_s(t)$ that falls within a frequency range. In this scenario, there is one "data component" per frequency range, although it will of course be appreciated that there may be sub-components of a data component associated with particular centre frequencies within a given frequency range. The audio signal $u(t)$ will be distributed across a frequency spectrum depending on the audio signal in question—it may be an audio signal with a large amount of bass, tenor, alto, soprano etc., or a profile spread amongst different frequencies etc. This audio frequency profile will have a correspondence with the expected speaker acceleration $a_s(t)$. For example, the audio frequency profile may be the Fourier transform of the time-domain expected speaker acceleration $a_s(t)$. Certain components of the expected speaker acceleration $a_s(t)$ will be caused by audio components across a certain frequency range—e.g. a bass audio signal component will generate a component of the expected speaker acceleration $a_s(t)$. Thus the data components of the speaker acceleration $a_s(t)$ are associated with an audio frequency and can thus be filtered into filter banks according to the frequency range with which they are associated. In some embodiments, the speaker acceleration is isolated using specific bands up to some specific cut-off frequency. These frequency bands can be chosen by the manufacturer. The bands may depend on the choice of the speaker and on the specific oscillating frequency of the haptic oscillator. The output of the BPF unit 22 is filtered speaker acceleration $a_f(t)$ which represents the derived data components that are indicative of behaviour of the audio speaker 12 when being driven by the input audio signal, each data component being associated with a respective frequency range. The behaviour here is mechanical acceleration of the speaker diaphragm, but may be speaker excursion of the diaphragm, or other suitable metric, as discussed above. It will also be appreciated that filters other than band pass filters may be used.

The filtered speaker acceleration $a_f(t)$ (representing all the data components) is then passed to the envelope tracking module 23. The processing up until this point may be considered as audio signal processing, and is performed by the group of modules 28. The passing of the filtered speaker acceleration $a_f(t)$ to the envelope tracking module 23 may be considered as the start of the haptic signal processing performed by the group of modules 29. The conversion from audio processing to haptic processing may be performed during the haptic signal processing. In particular, a haptic drive component is determined from each data component, a gain is selected to provide to each of the haptic drive components, the gain being selected for each respective frequency range, and each selected gain is applied to the respective haptic drive component to produce gain adjusted haptic drive components.

The determination of a haptic drive component from each data component may comprise taking a moving average integration window across the data component. This is to establish the "profile" or the "envelope" of the data component—it is to smooth the oscillation of sub-components of a data component that occurs across the frequency range of the data component. In this case, the haptic drive component $a_{env}(t)$, which is the envelope of filtered speaker acceleration $a_f(t)$ for a particular frequency range (i.e. a signal data component of $a_f(t)$), is indicative of a desired mechanical property of the haptic actuator, here acceleration of the haptic actuator, across that frequency range. By using the envelope of filtered speaker acceleration to determine the desired mechanical property (e.g. desired acceleration) of the haptic actuator, consistency between the audio output and the haptic response can be maintained. The particular envelope of the current audio signal will result in a haptic response that mirrors, i.e. is consistent with, the audio signal, and more specifically the mechanical behaviour of the speaker expected to result from the audio signal driving the speaker. This means that consistency is also maintained regardless of the particular speaker being used, as the properties of the speaker in question is taken into account (via the speaker model). This means that the speaker acceleration $a_f(t)$ is representative of the mechanical properties of the particular speaker being driven, and thus the haptic drive component is appropriate for the mechanical behaviour of the particular speaker when the speaker is driven by the audio signal.

A gain is then selected for each haptic drive component $a_{env}(t)$ based on the frequency associated with the haptic drive component, and applied to the respective haptic drive component. Thus a separate gain is provided to each haptic drive component $a_{env}(t)$ based on the frequency ranges associated with the haptic drive components. This allows haptic drive components associated with certain frequencies to be emphasised and others to be de-emphasised based on the use case. For example, it may be that haptic response is emphasised for low frequency components on the basis the user experience is improved by providing a strong haptic response for bass, e.g. because the speaker in question cannot reproduce audio output of that low frequency, so a haptic response is used instead. In one example, a first haptic drive components is associated with a first frequency range component and a second gain is associated with a second haptic drive component associated with a second frequency range, the first frequency range being a lower frequency range than the second frequency range, and wherein providing gains to the haptic drive components based on the frequency ranges associated with the haptic drive components comprises providing a higher gain to the first haptic drive component associated with the first frequency range component than the gain provided to the second haptic drive component associated with the second frequency range. The second gain may be a zero gain, for example.

Figure 3B:
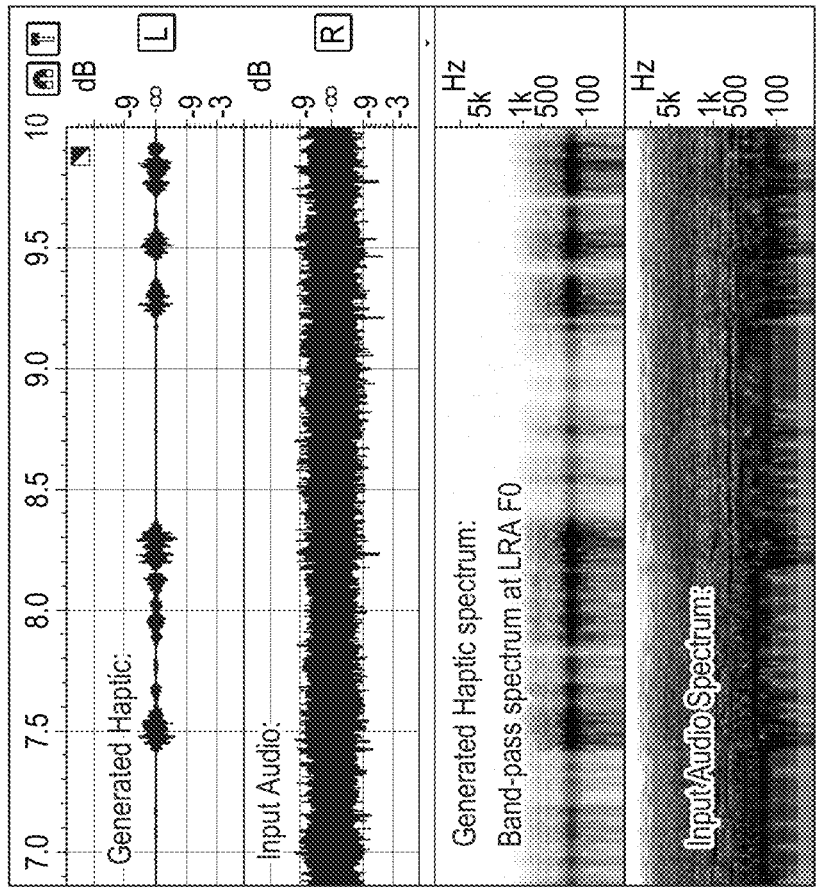
FIG. 3B is an illustration of haptic and audio output resulting from the graphic equalizer of FIG. 3A.
Figure 3A:
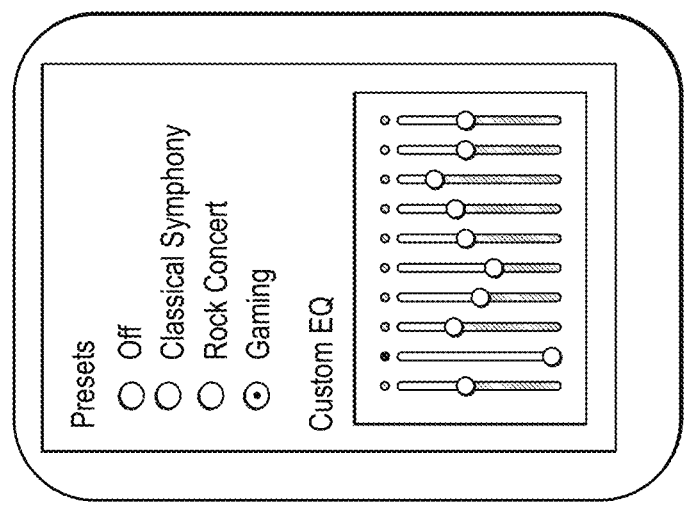
FIG. 3A is a schematic representation of an exemplary graphic equalizer according to aspects of the disclosure.

The gain to provide to each of the haptic drive components may be selectable by a user. For example, the gain may be selectable through a graphical user interface, GUI, such as that shown in FIG. 3, which is split into FIG. 3A shows a "graphic equalizer" on the left which provides various preset modes to cover various use cases, and FIG. 3B which shows haptic and audio response for a selected preset mode—in the case of FIG. 3 a "gaming mode". The presets represent a predetermined selection of gains to apply to the haptic drive components so as to emphasise haptic response for certain audio frequencies according to the use case. For example, the gaming preset may emphasise low frequency audio associated with explosions, gun shots etc., such that these noises result in a strong haptic response, which may improve user experience. The graphic equaliser may also provide a custom mode, in which each gain can be manually set for a given frequency range (a given haptic component $a_{env}(t)$) so that a user has maximum flexibility to adjust the haptic response in accordance with preference. On the right of FIG. 3, the haptic response for a gaming preset is shown against the input audio. It is shown here how haptic drive components associated with certain frequency ranges can be emphasised through application of the gains, while others are deemphasised. The GUI user-interface elements such as sliders may represent the adjustment of the gain on linear, logarithmic or other scaling based on human perception of the haptic vibration intensity.

Once the gains have been applied, a haptic drive signal is determined from the gain adjusted haptic drive components $a_{GA}(t)$, the haptic drive signal being so as to produce a mechanical behaviour of the haptic actuator when the haptic drive signal is used to drive the haptic actuator. In the arrangement of FIG. 2, this happens in two stages. Firstly, the gain adjusted haptic drive components $a_{GA}(t)$ are passed to amplitude modulator 24, which modulates a tone at the haptic actuator—a tone such as linear resonant actuator (LRA) resonant frequency F0 tone 27—with the gain adjusted haptic drive components $a_{GA}(t)$. $a_{GA}(t)$, here, is representing all the separate gain adjusted haptic drive components. These components provide the amplitude envelope to which the F0 tone is modulated. For example, the components may be recombined into a single signal before modulation. The modulation may be achieved using the equation:

$$a_h(t) = a_{GA}(t) * \sin(2\pi F0 t)$$

Figure 4:
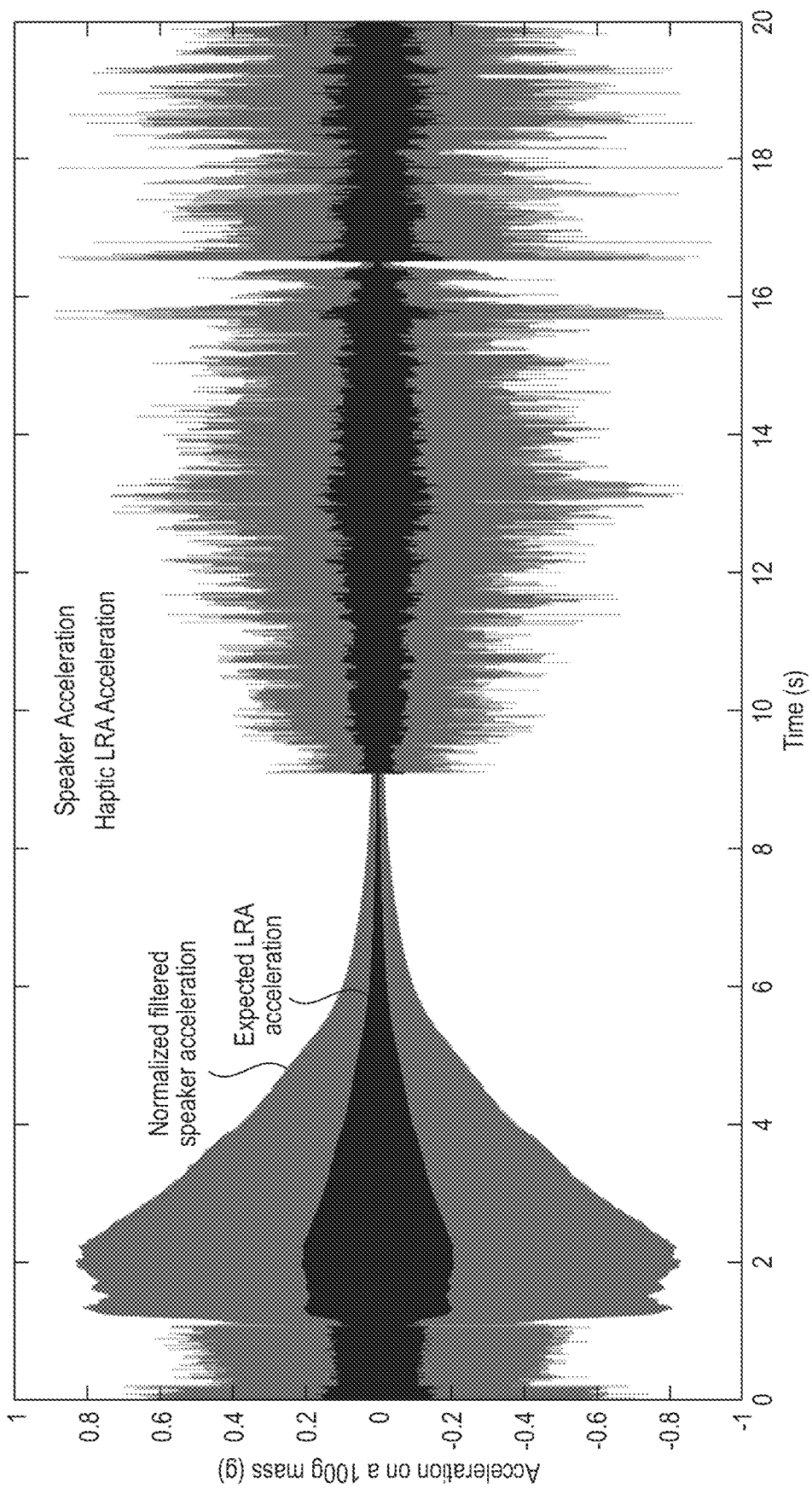
FIG. 4 is a graphical representation illustrating speaker and haptic acceleration according to aspects of the disclosure.

The output of this module 24 is $a_h(t)$, a signal or function that indicates the desired mechanical behaviour (in FIG. 2 it is the LRA acceleration) of the haptic actuator across the full frequency range—i.e. the output signal LRA acceleration $a_h(t)$ takes into account the gains. FIG. 4 provides an illustration of the LRA acceleration and how it is consistent with the speaker acceleration; the speaker acceleration provides the envelope for the haptic response, which provides the amplitude for a tone (or signal), here the LRA resonant frequency tone, that is modulated to produce the LRA acceleration $a_h(t)$. In other words, a signal/tone is modulated using the envelope—the envelope sets the amplitude for the signal, with the frequency of the signal being set by the resonant frequency of the LRA.

Secondly, the haptic actuator acceleration $a_h(t)$ is fed into haptic waveform generator The haptic waveform generator 25 is configured to determine the haptic drive signal (or waveform), here the LRA electrical drive voltage $u_h(t)$, that is such that, when the haptic drive signal is used to drive the haptic actuator, the haptic actuator behaves in the manner indicated by the haptic actuator acceleration $a_h(t)$. In other words, the waveform generator 25 analyses the desired haptic actuator acceleration $a_h(t)$ and determines the drive voltage to produce that mechanical behaviour. The details of the operation of the waveform generator is discussed in detail under a separate heading below. Briefly, however, generating the electrical drive voltage $u_h(t)$ comprises inputting the actuator acceleration $a_h(t)$ into a model that maps desired mechanical behaviour of the haptic actuator to the drive signal needed to produce that behaviour. This is a reverse mapping compared to the model used for the haptic actuator module, which took the input haptic drive signal and determined expected haptic actuator behaviour.

The waveform generator 25 comprises, or has access to, the model, e.g. stored in the memory of the drive signal generation module 11, which may be the memory of waveform generator 25 or a separate memory. In the present embodiment, the mechanical behaviour is the acceleration of the LRA actuator. It will be appreciated that other mechanical behaviour may be suitable, such as actuator excursion, or pressure output of the actuator etc.

The model may be defined by various predetermined electromechanical parameters of the particular haptic actuator being used (the model may differ between actuators—i.e. the model may be bespoke for the particular actuator so as to accurately predict that particular actuator's behaviour). The electromechanical parameters include those parameters that allow the determination of drive voltage for a desired mechanical behaviour (for a desired actuator acceleration in this case). For example, the electromechanical parameters may include one or more of the resonant frequency of the haptic actuator, spring stiffness (k), mass (m), mechanical damping factor (b), electromechanical coupling factor (BL), electrical resistance, electrical inductance or any combination thereof of the haptic actuator.

The haptic waveform generator 25 may also be configured to adjust one or more parameters of the model based on operational feedback from the haptic actuator 13. In particular, the audio-haptic drive signal generation module 11 may conduct one or more feedback measurements on the haptic actuator upon the haptic actuator being driven with the driving signal. In an aspect, a smart haptic driver may be an example of means for performing the feedback measurement. In particular, a feedback sensor and/or a zero crossing detector may be configured to perform to feedback measurement. These components may be functional components of the haptic waveform generator 25, or may be separate components. For example, the haptic waveform generator 25 may be configured to receive operational feedback comprising current and voltage feedback, along with LRA electromechanical parameters, measured directly from the haptic actuator 13 (in FIG. 2, LRA current (1), Voltage Feedback (2) and LRA electromechanical parameters (3))—i.e. the module 25 performs the feedback measurements—or a separate component may perform the measurements and communicate the measurements to the module 25. As noted above, the feedback may be converted from analogue as received from the haptic actuator, to digital for use by the haptic waveform generator 25. Either way, the feedback sensor (e.g. the waveform generator module 25) may measure a voltage across the haptic actuator that occurs due to the haptic actuator being driven. This voltage may be measured while the haptic actuator is driven with the driving signal. That is, the voltage may be measured simultaneously. Alternatively or in addition thereto, the feedback sensor may measure a current flowing through the haptic actuator that occurs due to the haptic actuator being driven. This current may also be measured simultaneously while the haptic actuator is being driven with the driving signal. In another aspect, a zero crossing detector may measure the back electromotive force (BEMF) induced in the haptic actuator due to driving of the haptic actuator with the driving signal and detect the zero crossings. The zero crossing detector may also measure other characteristics of the BEMF such as waveform ringdown, envelope decay, etc. Again, the zero crossing detector may be a part of module 25, or may be a separate component that communicates the measurements to module 25.

This feedback is live feedback from the haptic actuator as it is being driven by a haptic drive signal (e.g. haptic drive signal different from $u_h(t)$). This live feedback allows haptic waveform generator 25 to determine how the haptic actuator is actually performing in real time, and can then adjust the model accordingly. This may allow the waveform generator 25 to take account of specific—e.g. current—operating conditions experienced by the haptic actuator, such as temperature, age of actuator etc. so as to provide the most accurate and up-to-date model for the actuator as possible.

In one example, the current and voltage feedback may be used to derive current electromechanical parameters, which can then be used to update the parameters of the model. For example, the electromechanical parameters of the model can be adjusted to match those calculated from the feedback, which will result in a haptic drive signal $u_h(t)$ that causes the haptic actuator to mechanically behave in the desired way— i.e. as indicated by $a_h(t)$. Whilst the arrangement shown in FIG. 2 involves speaker current and voltage feedback to optimise the model, it will be appreciated that embodiments are possible which do not involve such feedback. In such embodiments the drive voltage is simply determined by a predetermined model set ahead of time, for example during initial set up or manufacture.

Once the haptic drive signal $u_h(t)$ has been generated, the audio signal $u(t)$ and the haptic drive signal $u_h(t)$ may be passed to the speaker 12 and the actuator 13 to produce an audio and haptic output. Importantly, the haptic drive signal has been generated from the expected mechanical behaviour of the speaker 12 when driven by the audio signal in question. This maintains consistency between the audio and the haptic output—the haptic output mirrors the audio output, not merely at the electronic level (i.e. the haptic drive signal does not simply mirror the input audio signal), but rather mechanical behaviour of the speaker is taken into account. Further, live feedback may be provided to ensure the mechanical behaviour of the speaker and the actuator are being accurately modelled and to ensure that desired behaviour of the haptic actuator is achieved and that it is appropriate for the particular speaker and actuator in question. Finally, gain is applied to haptic drive components based on frequency ranges of the audio, allowing certain components of the audio signal to translate to greater or lesser haptic response depending on the use case.

Figure 5:
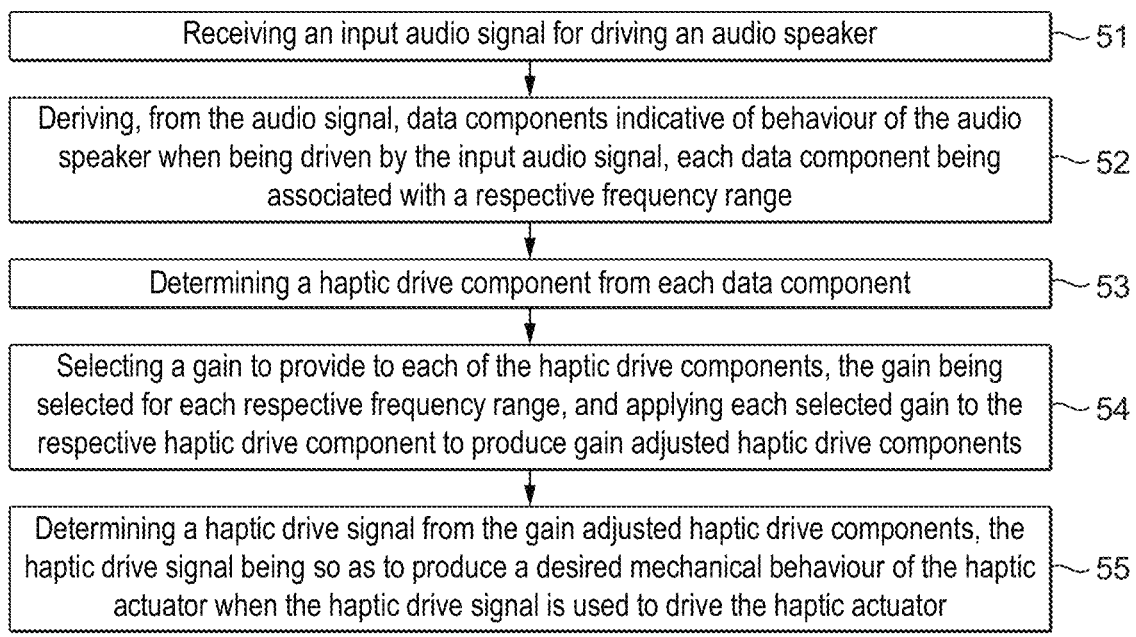
FIG. 5 is a flow diagram illustrating a process for generating a haptic drive signal according to aspects of the disclosure.

With reference to the flow diagram of FIG. 5, in use the system for haptic drive signal generation of FIG. 1 operates as follows. At step 51 of FIG. 5, an audio signal is received by audio-haptic drive signal generation module 11, for example at the speaker module 21. The input audio may be received from memory, from a server or a network, etc. and may represent a music track, audio for a video game, audio for a movie, etc. At step 52, audio-haptic drive signal generation module 11 derives, from the audio signal, data components indicative of behaviour of the audio speaker when being driven by the input audio signal, each data component being associated with a respective frequency range. As discussed above, this step may be performed by the speaker module 21 and the filter module 22. Each data component may be as discussed in relation to FIG. 2 and may be determined in the same manner. For example, each data component may be indicative of a mechanical behaviour of the audio speaker when being driven by the audio signal across the respective frequency range, and in particular, the data components may be indicative of speaker excursion, speaker acceleration, or speaker pressure when the audio speaker is driven by the input audio signal. As discussed above, deriving the data components may comprise predicting the mechanical behavior of the audio speaker when being driven by the audio signal and determining the data components from the prediction of the mechanical behavior. The predicting may comprise inputting the audio signal into a model (e.g. the model discussed above) of the mechanical behavior of the audio speaker, the model configured to generate a prediction of the mechanical behavior of the audio speaker when driven by the audio signal input into the model, as discussed in relation to FIG. 2. The prediction may be expected speaker acceleration $a_s(t)$. The predicting may further comprise adjusting one or more parameters of the model based on operational feedback from the audio speaker, with the operational feedback being voltage and/or current feedback from the audio speaker as discussed previously. Determining the data components from the prediction of the mechanical behavior may further comprise filtering the prediction of the mechanical behavior according to audio frequency, the prediction of the mechanical behavior being filtered into the data components to produce, for example, filtered speaker acceleration $a_f(t)$.

At step 53, module 11 determines a haptic drive component $a_{env}(t)$ from each data component, and at step 54, the module 11 selects a gain to provide to each of the haptic drive components, the gain being selected for each respective frequency range, and applies each selected gain to the respective haptic drive component to produce gain adjusted haptic drive components. These steps may be performed by the envelope tracking module 23. The haptic drive components and the gains may be as discussed above in relation to FIG. 2 and may be determined in the same manner. For example, determining a haptic drive component from each data component may comprise applying a moving average (or a digital FIR or IIR filter, as appropriate) to each data component to produce a respective haptic drive component. The gain to provide to each of the haptic drive components may be selectable by a user, for example the GUI of FIG. 3. The gains may be provided to the haptic drive components based on the frequency ranges associated with the haptic drive components as discussed above. For example, a first haptic drive components may be associated with a first frequency range component and a second haptic drive component may be associated with a second frequency range, the first frequency range being a lower frequency range than the second frequency range, and wherein providing gains to the haptic drive components based on the frequency ranges associated with the haptic drive components comprises providing a higher gain to the first haptic drive component associated with the first frequency range component than the gain provided to the second haptic drive component associated with the second frequency range. The gain provided to the second haptic drive component may be a zero gain. Each haptic drive component $a_{env}(t)$ may indicative of a mechanical behavior of the haptic actuator when driven by a haptic drive signal determined from the respective haptic drive component, for example an acceleration of the haptic actuator as discussed in relation to FIG. 2.

Finally, at step 55, the module 11 determines a haptic drive signal from the gain adjusted haptic drive components, the haptic drive signal being so as to produce a mechanical behaviour of the haptic actuator when the haptic drive signal is used to drive the haptic actuator. This may be determined by the modulator 24 and the waveform generator 25 of FIG. 2 as discussed above. For example, determining a haptic drive signal from the gain adjusted haptic drive components may comprise determining, from the gain adjusted haptic drive components, the haptic drive signal to produce the proper mechanical behavior of the haptic actuator indicated by the gain adjusted haptic drive components. This may be done by amplitude modulating a tone/signal at the haptic actuator—a tone such as a linear resonant actuator (LRA resonant frequency F0 tone—with the gain adjusted haptic drive components $a_{GA}(t)$—i.e. a signal/tone is modulated using the envelope defined by the haptic drive components—the envelope sets the amplitude for the signal, with the frequency of the signal being set by the resonant frequency, for example the LRA acceleration $a_h(t)$. Here, the modulated acceleration $a_h(t)$ is obtained based on the acceleration envelope represented by the gain adjusted haptic drive components and the resonant frequency of the haptic actuator The modulated signal is then input into a model of the mechanical behavior of the haptic actuator, the model configured to generate a haptic drive signal that will recreate the mechanical behavior indicated by the modulated signal when the haptic drive signal is used to drive the haptic actuator. This may comprise adjusting one or more parameters of the model based on operational feedback from the haptic actuator, the operational feedback being, for example, voltage and/or current feedback from the haptic actuator. This may be done as described in relation to waveform generator 25 of FIG. 2.

Figure 11:
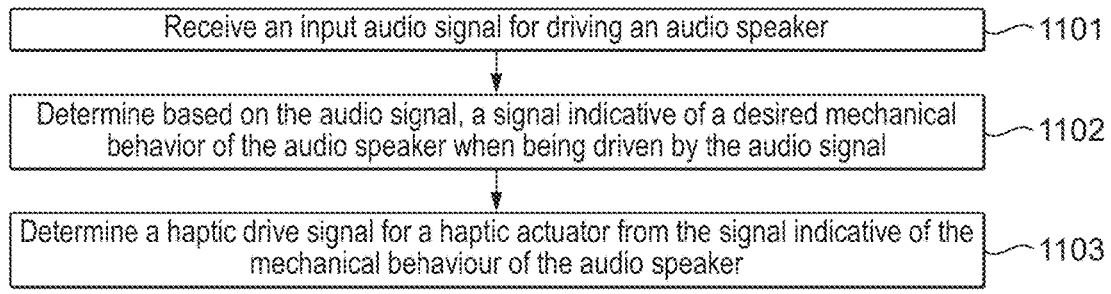
FIG. 11 is flow diagram illustrating a process for generating a haptic drive signal according to aspects of the disclosure.

It is noted that whilst aspects of the disclosure have been described including all the modules and functionality of FIG. 2, other aspects are contemplated. For example, according to some aspects, the filtering and the provision of gains based on frequency may not be necessary. In such an arrangement, the audio-haptic drive signal generation module 11 may receive an input audio signal for driving an audio speaker (this may be as described in relation to FIG. 2, i.e. receiving an audio signal from a memory, network, server etc.). The module 11 may then determine based on the audio signal, a signal indicative of a mechanical behavior of the audio speaker when being driven by the audio signal. This may be performed by a speaker module such as module 21, and may be performed in the same manner as described in relation to this module. For example, an expected speaker acceleration $a_s(t)$ may be determined. Module 11 may then determine a haptic drive signal for a haptic actuator from the signal indicative of the mechanical behaviour of the audio speaker. Here, a haptic envelope may be determined directly from expected speaker acceleration $a_s(t)$, i.e. without passing through BPF module 22. In such a case, the envelope tracking module 23 may not apply gains to haptic drive components. Rather an envelope for the whole signal is determined. A tone at the haptic actuator—such as a linear resonant actuator (LRA) resonant frequency F0 tone—may then be amplitude modulated using the envelope to determine a haptic acceleration $a_h(t)$ by a modulator such as modulator 24, and from this a drive voltage may be determined, for example by waveform generator 25 as described above. It will thus be appreciated that aspects are not limited to the application of gain to specific haptic drive components—in certain aspects, embodiments may be provided that provide a haptic drive signal derived directly from an expected mechanical property of the speaker. The steps of this process are shown in the flow diagram of FIG. 11—i.e. receive an input audio signal for driving an audio speaker at step 1101, determine based on the audio signal, a signal indicative of a mechanical behavior of the audio speaker when being driven by the audio signal at step 1102, and determine a haptic drive signal for a haptic actuator from the signal indicative of the mechanical behaviour of the audio speaker at step 1103.

As a further alternative, aspects are possible that involve filtering and gain application, but without deriving haptic components from expected mechanical properties of the speaker. In such embodiments, the input audio may be fed directly into a filtering module, such as BPF module 22, and a haptic envelopes—the haptic drive components—are determined from the input audio directly. This may be done in the same manner as described in relation to FIG. 2, for example, with each haptic drive component being associated with a frequency range. Gain can then be applied to the derived haptic drive components as described above. A modulator, such as modulator 24, may modulate the components to provide a modulated signal and that signal may then be passed to a waveform generator, such as generator 25, to produce a drive voltage to drive the actuator. In such arrangements, the haptic output will be linked to the audio through being derived directly from the audio input signal.

We will now turn to a further aspect of the disclosure, before describing a specific embodiment of aspects of the disclosure.

Time Synchronisation of Audio and Haptic Output

The audio and haptic output may be processed as discussed above and passed to the audio and haptic speakers, for example of FIG. 1. However, if the two outputs are not well synchronized in time, the haptic response may not appear to a user as consistent with the audio output which may degrade user experience. Thus, aspects of the disclosure provide methods and systems for the time synchronization of the audio output with the haptic output. It will be appreciated that the time synchronization may be implemented in combination with the aspects discussed above for the generation of haptic drive signals, or separately (i.e. it may be used to synchronize audio and haptic output not generated as discussed above).

Figure 6:
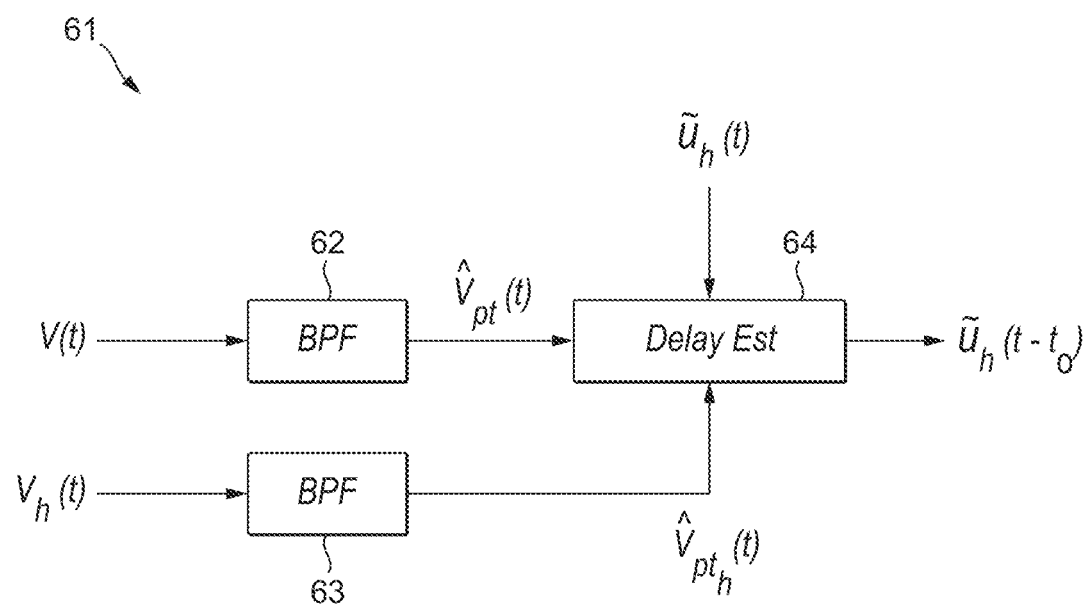
FIG. 6 is a schematic representation of an exemplary system illustrating functional modules for implementing aspects of the disclosure.

Referring to FIG. 6, a system 61 for synchronizing the audio output of an audio speaker with the haptic output of an haptic actuator. FIG. 6 shows the functional modules for performing the synchronization, which may be implemented in hardware or software as appropriate. The system 61 may be implemented as part of system 10 of FIG. 1, for example, within audio-haptic drive signal generation module 11.

Firstly, the system generates i) an audio output from the audio speaker using an input audio signal including a pilot input signal (the input audio signal may be a pilot tone, or may include a pilot tone in addition to other audio data) and receiving a speaker response signal from the audio speaker in response to the generated audio output, and ii) a haptic output from the haptic actuator using an input signal including an pilot input signal and receiving a haptic response signal from the haptic actuator in response to the generated haptic output. In the example shown in FIG. 6, a single input audio signal including a pilot audio tone—e.g. a predetermined audio signal—is generated, and from this an audio output and haptic output is generated from the audio speaker (e.g. speaker 12) and the haptic actuator (e.g. actuator 13) respectively. The generation of the audio output and the haptic output from the pilot input signal may follow the process described in relation to FIGS. 2 and 5, for example, where signal $u(t)$ represents the pilot tone. It will be appreciated that alternatives are possible, for example, simply providing separate pilot audio and haptic signals to generate the audio and haptic outputs.

Once the audio output and the haptic output has been generated by the pilot tone (pilot input signal), feedback voltage and/or current signals are received. Here, a feedback voltage signal $v(t)$ from the audio speaker and a feedback voltage signal $v_h(t)$ from the haptic actuator are received. Both signals are passed through filter modules, here BPF modules 62 and 63 of FIG. 6. From these filter modules, the speaker response signal $v_{ptA}(t)$ and the haptic response signal $v_{ptH}(t)$ are extracted. These signals are the voltage response signals due specifically to the pilot tone. For example, the pilot tone may have a certain frequency, or may be designed to generate a certain output frequency from the speaker and the actuator. The filter modules 62 and 63 may filter for this frequency so as to eliminate feedback signals not due to the pilot tone, thus extracting the feedback that is specifically due to the pilot tone (this specific feedback being the response signals $v_{ptA}(t)$ and $v_{ptH}(t)$.

The response signals $v_{ptA}(t)$ and $v_{ptH}(t)$ are then passed to the delay estimation module 64 where a time delay between the response signals is calculated. More precisely, the speaker acceleration and the haptic actuator acceleration that resulted from the pilot tone can be derived from the response signals (e.g. using models similar to those described above that map a voltage output to a corresponding acceleration based on the electromechanical properties of the speaker or actuator preconfigured into the model), and a time difference between the accelerations can be determined. In some embodiments, the time difference between the respective speaker and haptic accelerations may be determined by applying a certain delay to the haptic acceleration. Then the cross-correlation between the speaker and haptic acceleration is calculated corresponding to this candidate delay value. Similarly, the cross-correlation between the speaker and haptic accelerations is calculated for a set of delays which take values between a certain delay ranges, for example −0.5 seconds to +0.5 seconds. The delay value which maximizes the cross-correlation between the speaker and haptic acceleration is then the estimated delay of the system, denoted as t0 in FIG. 6. It will be appreciated that other fractional delay estimation procedures in the frequency-domain are also possible.

Figure 12:
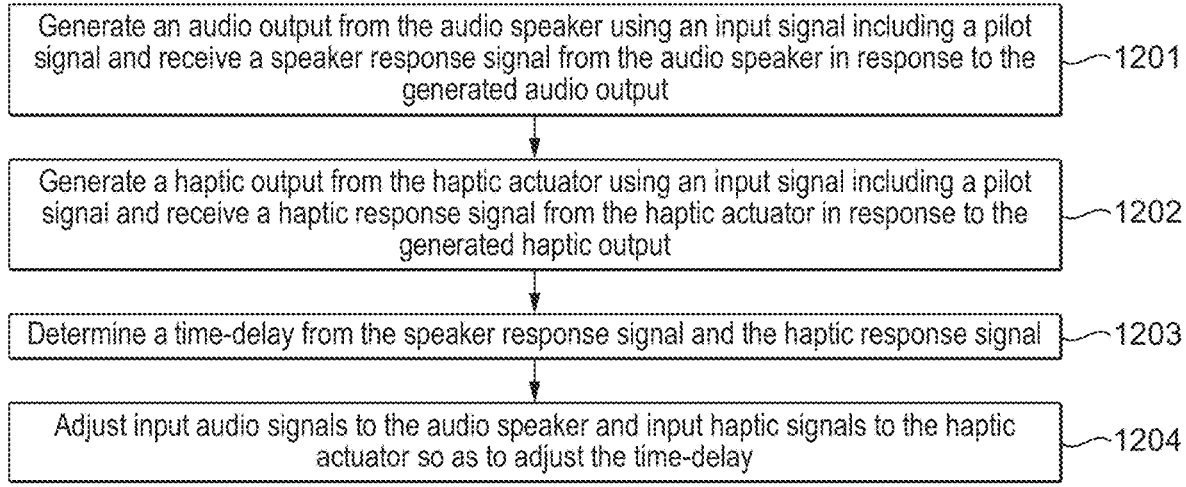
FIG. 12 is a flow diagram illustrating a process for time synchronisation of audio and haptic output according to aspects of the disclosure

Once the time delay is determined from the speaker response signal and the haptic response signal, the next haptic drive signal $u_h(t)$ to be sent to the haptic actuator is input into the delay estimation module 64. This next haptic drive signal is then offset by the time delay so as to cancel the delay between the audio output and the haptic output. This is shown by output drive signal $u_h(t-t_0)$ where $t_0$ is the calculated time delay. This amounts to a closed-loop feedback to the haptic drive voltage to cancel the delay. Of course it will be appreciated that such close-loop feedback may equally be applied to the audio drive signal or to both, provided the signal adjustment is such as to cancel the delay between the audio and haptic output. The steps of this synchronisation process are shown in FIG. 12. At step 1201, audio output from the audio speaker is generated using a pilot input signal and a speaker response signal is received from the audio speaker in response to the generated audio output. At step 1202, haptic output from the haptic actuator is generated using a pilot input signal and a haptic response signal is received from the haptic actuator in response to the generated haptic output. At step 1203, a time-delay from the speaker response signal and the haptic response signal is determined. At step 1204, input audio signals to the audio speaker and input haptic signals to the haptic actuator are adjusted so as to adjust the time-delay.

Speaker Module

The operation of speaker module 21 of audio-haptic drive signal generation module 11 according to aspects of the present disclosure will now be described in greater detail.

The speaker module 21 predicts (e.g., estimates) the excursion of the loudspeaker (audio speaker) 12 for an input audio signal u(t) (which may be a speech signal, for example) using the input audio signal u(t) and a model of the speaker 12, in particular an excursion transfer function h(t) of the loudspeaker 12.

More particularly, to estimate the excursion, the original audio/speech signal (the input signal) u(t) is filtered with the impulse response of excursion transfer function h(t) of the loudspeaker to estimate the excursion e(t) for the input audio/speech signal. If the impulse response of excursion transfer function h(t) of the loudspeaker 12 is known, the excursion e(t) may be estimated by e(t)=h(t)*u(t), where * denotes a convolution of two sequences. This may be performed by an IIR filter for example, but other implementations are possible.

As discussed in relation to FIG. 2, the module of the speaker 12—i.e. the transfer function h(t)—is a known function stored in memory and available to the speaker module 21. The transfer function h(t) may be initially predetermined, for example during manufacture or initial set up of the system 10, based on known or expected electromechanical properties of the speaker. These properties may be known properties common to speakers of the type of speaker 12, or may be determined by testing of speaker 12 during manufacture. These properties will determine the initial parameters that define the mode/transfer function. The parameters of the model may then be updated in real time as current electromechanical properties of the speaker—i.e. its properties in operation—are determined through live feedback, as discussed above.

Once e(t) has been determined, the double derivative of e(t) may be determined by the speaker module 21 to determine expected speaker acceleration $a_s(t)$. It will be appreciated that other appropriate metrics, such as expected speaker pressure, may be used as appropriate. This may be achieved by using the appropriate model/transfer function.

The speaker module may also be configured to adjust the input audio based on predicted speaker behaviour, for example to protect the speaker. This may be done just using the model, i.e. without live feedback, or including live feedback. In this way the speaker module acts as a speaker protection module, for example a limiter, that prevents audio signals that would cause audio responses that could damage the speaker. For example, audio inputs that are predicted by the model to cause mechanical behaviour that may damage the speaker are modified such that the modified audio speaker causes mechanical behaviour that is safe for the speaker to perform (i.e. carries a low risk of speaker damage).

For example, a maximum speaker excursion may be calculated from the transfer function h(t) of the speaker and the audio input signals may be modified to limit the audio speaker to keep excursion below or equal to the maximum excursion.

In addition to limiting the excursion, the speaker module may, in parallel, determine adjustments to the audio signal for optimal audio output given the known operating conditions of the speaker. For example, the speaker module may simultaneously limit excursion and also adapt the signal to maximize perceived volume of the limited excursion. Other limiting and optimisation functionality is possible as would be apparent. This functionality may be performed alongside determination of speaker acceleration, for example, and may be performed by appropriate software running on the hardware of the system.

Waveform Generator

The operation of waveform generator 25 of audio-haptic drive signal generation module 11 according to aspects of the present disclosure will now be described in greater detail.

The generator 25 may calculate a velocity vel(t) and an excursion ex(t) of the haptic actuator based on the modulated acceleration (t). In an aspect, the following equations may be applied to calculate vel(t) and ex(t):

$$vel(t) = \int_0^t a_h(t) dt \qquad (3)$$

$$e_H(t) = \int_0^t vel(t) dt \qquad (4)$$

The generator 25 may calculate an electromagnetic force F(t) to move the moving mass of the haptic actuator based on the modulated acceleration $a_h(t)$, the velocity vel(t), the excursion ex(t) and on one or more parameters of the haptic actuator. In an aspect, the following equation may be applied to calculate F(t) in:

$$F(t) = m_h * a_h(t) + b_h * vel(t) + k_h * e_H(t)$$

In the above equation for F(t), $m_h$ may represent the mass of the moving part of the haptic actuator, $b_h$ may represent the dampening factor of the haptic actuator, and $k_h$ may represent the spring stiffness of the haptic actuator. Note these are identified as haptic actuator parameters that may be tracked through continuous monitoring of feedback measurements, as shown in FIG. 2. In other words, the parameters of the haptic actuator may be continuously monitored and updated through the closed-loop feedback.

The waveform generator 25 may calculate a voltage $u_h(t)$ of the driving signal and a current I(t) through the haptic actuator based on the electromagnetic force F(t) and the one or more parameters of the haptic actuator. In an aspect, the following equations may be applied to calculate the voltage $u_h(t)$ and the current I(t):

$$I(t) = F(t)/BL_h \qquad (6)$$

$$u_h(t) = I(t) * R + L\frac{di}{dt} + BL_h * vel(t)$$

In the above two equations for I(t) and $u_h(t)$, R, the electrical resistance of the haptic actuator, may represent an ohmic drop, L may represent an inductance, and $BL_h$ may represent the electromechanical couple factor of the haptic actuator. Again, these may be tracked by the tracker 219 through continuous monitoring of feedback measurements. The driving signal $u_h(t)$) may be an analog drive voltage applied to the haptic actuator by the device (e.g., audio-haptic drive signal generation module, which may be part of a mobile device for example). In an aspect, digital coder/decoder CODEC and/or a smart haptic driver may be examples of means for performing the process steps described in this section. In some embodiments, an amplifier may be configured to drive the haptic actuator with the generated drive signal.

Figure 7:
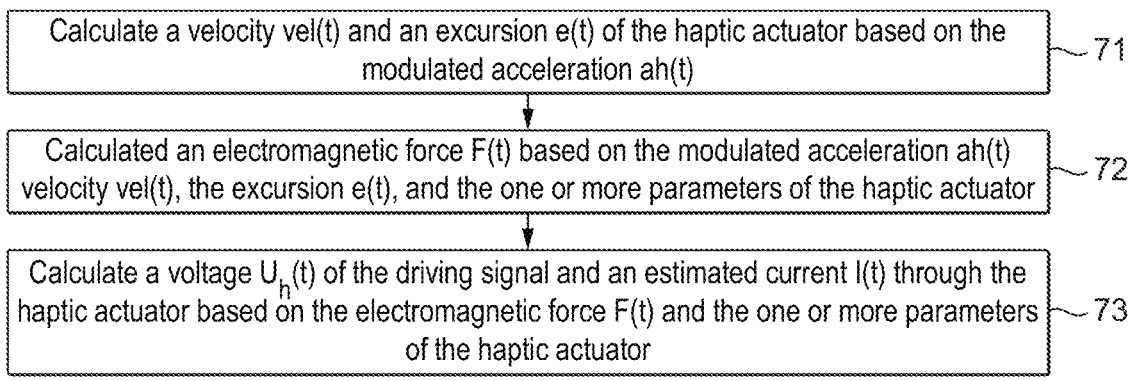
FIG. 7 is a flow diagram illustrating a process for generating a haptic drive signal according to aspects of the disclosure.

FIG. 7 shows a flow diagram for the steps that may be taken by the waveform generator 25 in generating the drive voltage from the haptic acceleration $a_h(t)$. The steps are as follows. At steps 71, velocity vel(t) and an excursion $e_H(t)$ of the haptic actuator based on the modulated acceleration $a_h(t)$ is calculated. At step 72, electromagnetic force F(t) is calculated based on the velocity vel(t), the excursion e(t), and the one or more parameters of the haptic actuator. At step 73, voltage $u_h(t)$ of the driving signal and a current I(t) through the haptic actuator is calculated based on the electromagnetic force F(t) and the one or more parameters of the haptic actuator. These steps may be implemented in the manner described above in this section.

Further Embodiments

Figure 8:
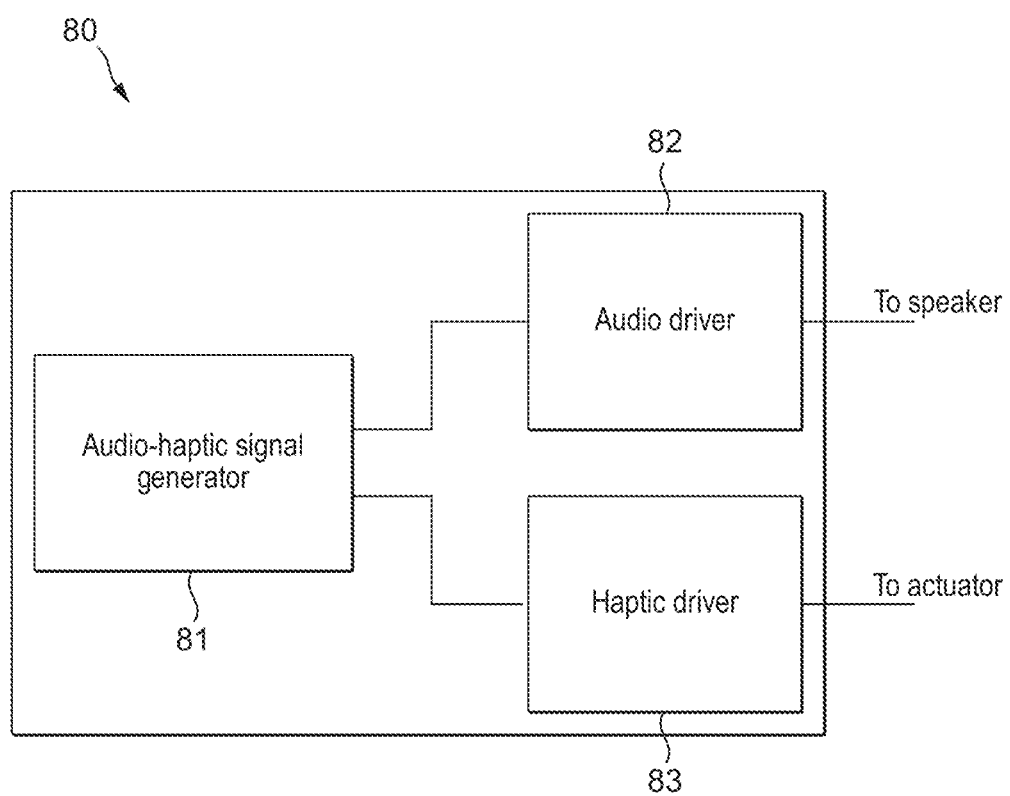
FIG. 8 is a schematic representation of an exemplary system for implementing aspects of the disclosure according to an embodiment.
Figure 13:
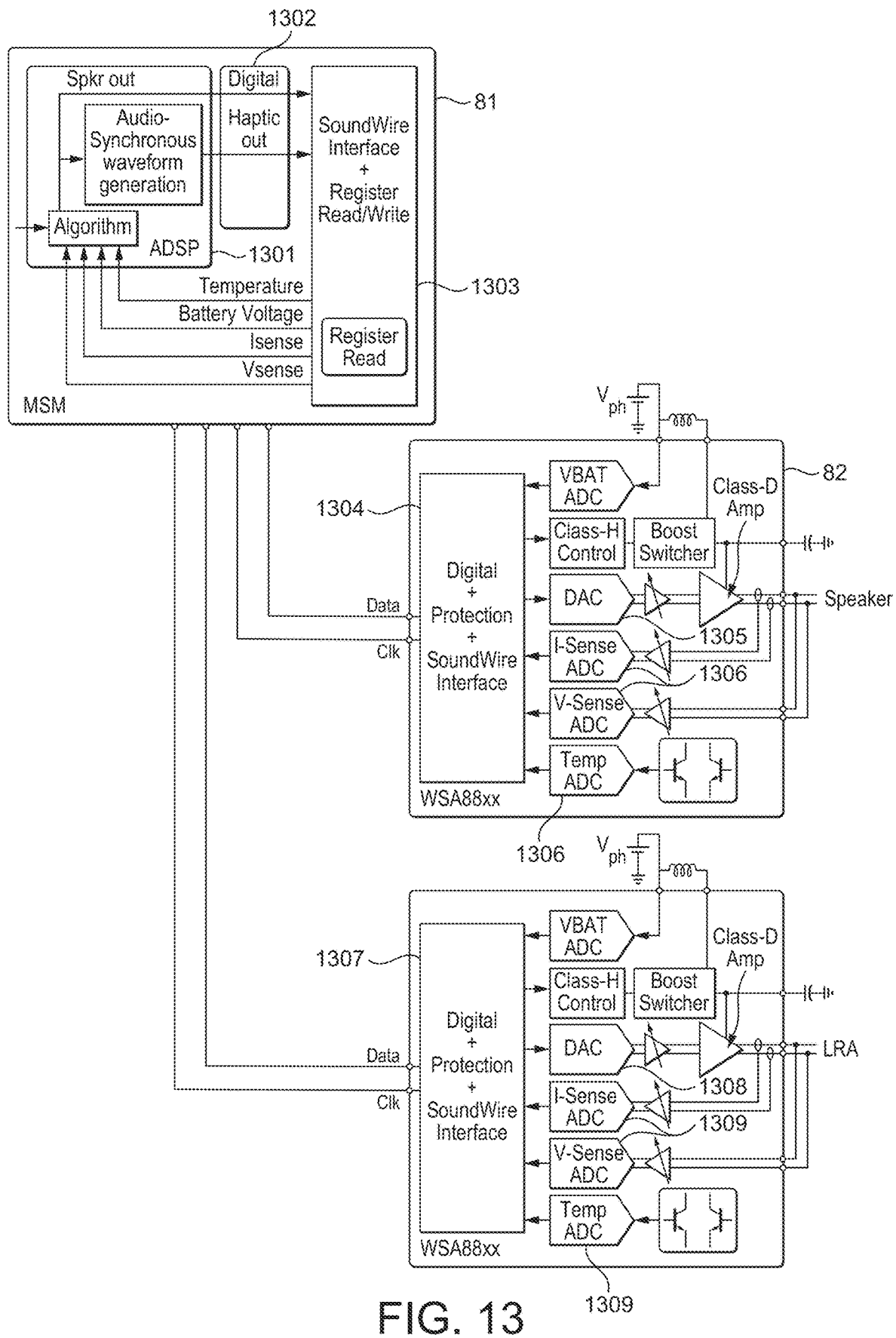
FIG. 13 is a schematic representation of the exemplary system of FIG. 8 showing additional details of the system.

A specific embodiment implementing aspects of the disclosure will now be discussed in relation to FIGS. 8, 9 and 13. FIG. 8 shows an audio-haptic drive signal generation module 80, which may correspond to module 11 of FIG. 1 but it will be appreciated that module 11 is not limited to the module shown in FIG. 8. FIG. 8 shows the main function modules of the embodiment, with FIG. 13 showing additional details of each of the modules of FIG. 8. Module 80 comprises audio-haptic signal generator 81, which may perform all the functions described in relation to FIG. 2, and may be implemented by appropriate hardware and/or software, for example by a processor. Module 80 further comprises an audio driver 82 such as an audio-amplifier and a haptic driver 83, which may perform the analogue to digital, ADC, or digital to analogue, DAC, conversions of the signals being passed between the audio-haptic signal generator and the speaker and actuator.

The audio-haptic signal generator 81 may comprise a processing unit 1301 which may implement the various processing steps discussed herein. For example, the processing unit may implement the functional modules of FIG. 2 and FIG. 6 in one or more processors and suitable software, for example. As shown in FIG. 13, the processing unit comprises an audio-synchronous waveform generation module which illustrates the various modules described herein for performing the audio-to-haptic conversion. The audio-haptic signal generator 81 has outputs 1302 for digital audio signal output and digital haptic signal output. The outputs are connected to an interface and register unit 1303, which receives signals and directs the signals to their appropriate destinations. The processing unit 1301 also has inputs for receiving feedback from the speaker and the actuator, such as temperature, battery voltage, and sensed current and voltage. These feed into an algorithm unit which updates the speaker and actuator models as discussed above.

The audio driver 82 may receive an audio input signal, for example input signal u(t) shown in FIG. 2, from the audio-haptic signal generator 81, and is configured to drive the speaker with this input signal. In certain embodiments, the audio driver is directly connected to the speaker for driving the speaker. Further, the audio driver may perform the feedback measurements discussed in relation to FIG. 2—the audio driver may measure the voltage and current values of the speaker as it operates, along with other relevant operating parameters of the speaker (e.g. temperature). The audio driver may feed this back to the audio-haptic drive signal generation module 80 in order for the module 80 to update the speaker module (or transfer function) for the generation of the speaker acceleration $a_s(t)$. The audio driver may comprise a feedback sensor for performing these feedback measurements on the speaker. The audio driver may also convert the digital input signal u(t) into a corresponding analogue drive voltage for driving the speaker. In more detail, the audio driver 82 may receive the audio signal output from the audio-haptic signal generator 81. The audio signal may be received at an interface module 1304 which performs various functions, such as speaker protection, as well as signal routing. The received audio signal, which is a digital signal, is passed to DAC 1305 for digital to analogue conversion before being passed to the speaker. Further, the interface module 1304 receives feedback signals which it can then pass on to the signal generator 81. For example, temperature, current and voltage readings from the speaker are taken, converted to digital values by separate ACD converters 1306 and passed to the interface module 1304. The temperature, current and voltage readings may be taken by appropriate sensors.

The haptic driver 83 may receive a haptic drive signal, for example haptic drive signal $u_h(t)$ of FIG. 2, from the audio-haptic signal generator 81. This signal may be generated as described in relation to FIG. 2. The haptic driver 83 may be configured to drive the haptic actuator with the received drive signal. In certain embodiments, the haptic driver 83 is directly connected to the haptic actuator for driving the actuator. Further, the haptic driver may perform the feedback measurements discussed in relation to FIG. 2—the haptic driver may measure the voltage and current values of the speaker as it operates, along with other relevant operating parameters of the speaker (e.g. temperature). The audio driver may feed this back to the audio-haptic drive signal generation module 80 in order for the module 80 to update the haptic module (or transfer function) for the generation of the haptic acceleration $a_h(t)$. The haptic driver may comprise a feedback sensor for performing these feedback measurements on the actuator. The haptic driver may also convert the digital haptic drive signal into a corresponding analogue drive voltage for driving the actuator. In more detail, the haptic driver 83 may receive the haptic signal output from the audio-haptic signal generator 81. The haptic signal may be received at a haptic driver interface module 1307 which performs various functions, such as actuator protection, as well as signal routing. The received haptic signal, which is a digital signal, is passed to DAC 1308 for digital to analogue conversion before being passed to the actuator, here an LRA. Further, the interface module 1307 receives feedback signals which it can then pass on to the signal generator 81. For example, temperature, current and voltage readings from the actuator are taken, converted to digital values by separate ACD converters 1309 and passed to the interface module 1307. The temperature, current and voltage readings may be taken by appropriate sensors.

Figure 9:
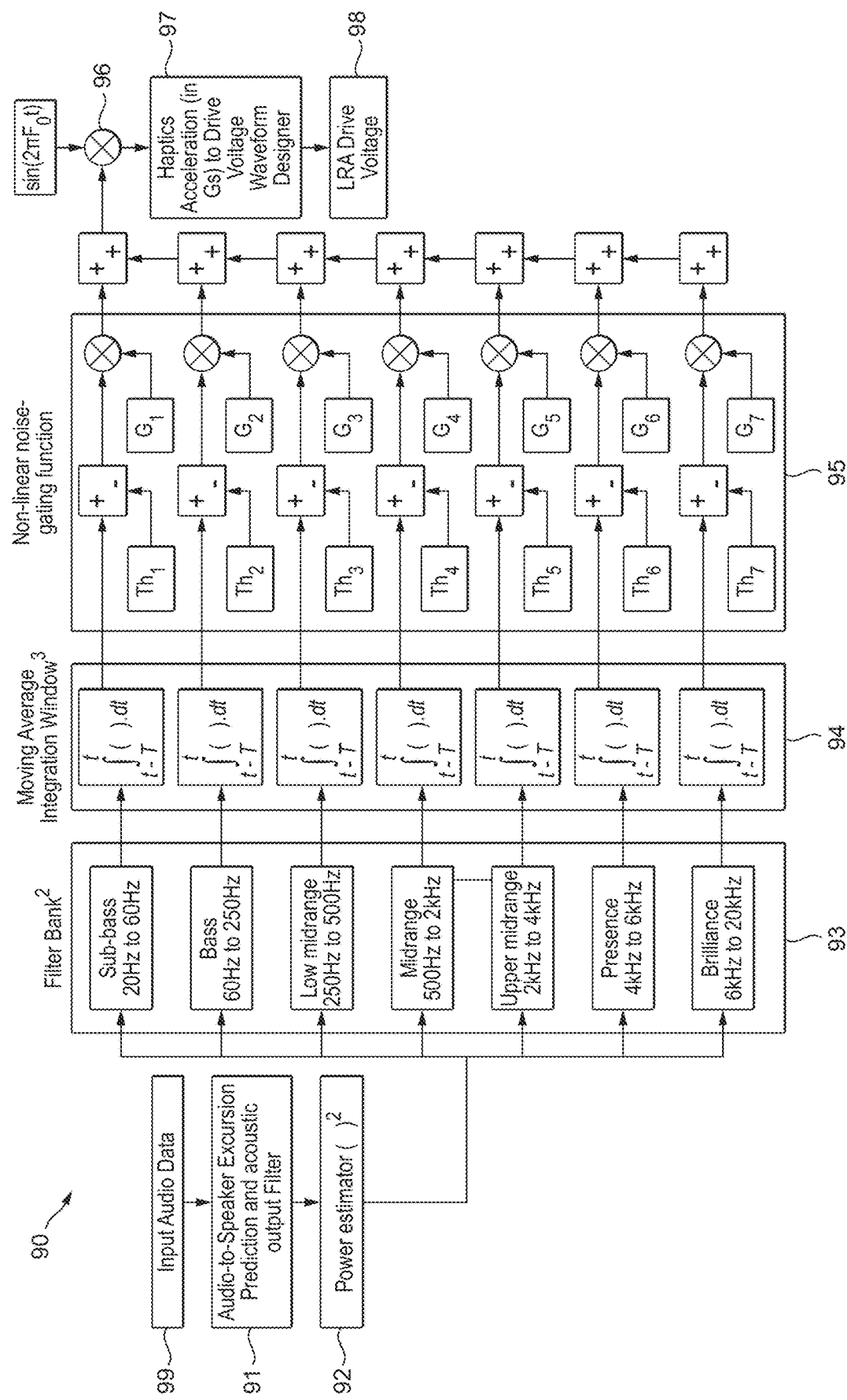
FIG. 9 is a schematic representation of an exemplary system illustrating functional components for implementing aspects of the disclosure according to an embodiment.

Turning to FIG. 9, an example embodiment for implementing aspects of the disclosure is shown. FIG. 9 shows a system for haptic signal generation 90 comprising functional modules which may be implemented in hardware and/or software of the audio-haptic signal generator 81 of FIG. 8. The functional modules of FIG. 9 show details of aspects of the disclosure and may be implemented by the general modules of FIG. 2, or other appropriate modules. It is noted that the system of FIG. 2 is not limited to the specific embodiment of FIG. 9—the embodiment of FIG. 9 shows a possible implementation of the system of FIG. 2.

As shown in FIG. 9, input audio data—e.g. audio signal u(t), shown in FIG. 9 by unit 99—is input into an audio-to-speaker excursion prediction and acoustic output filter 91. This filter module 91 derives speaker excursion e(t) from the input audio and outputs the excursion to power estimator 92 that determines a signal power from the excursion e(t). In this way, the modules 91 and 92 are acting as the speaker module 21 of FIG. 21, i.e. they are functionally equivalent. It is noted that in the embodiment of FIG. 9 signal power is derived from speaker excursion rather than speaker acceleration, however it will be appreciated that either may be used as appropriate for the particular use case. In any case, the signal power remains representative of the relevant mechanical property of the speaker—a power quantity is simply used for ease of operation. It will be appreciated that conversion to signal power may not be necessary and simply using the direct excursion or acceleration signal is possible. The derived power signal is then split into data components (indicative of behavior—the excursion of the speaker membrane—of the audio speaker when being driven by the input audio signal) according to frequency. This is performed by the filter bank 93 of FIG. 9. The component of the power signal associated with sub-bass (20 Hz to 60 Hz) audio is separated into a sub-bass bank. The component of the power signal associated with bass (60 Hz to 250 Hz) audio is separated into a bass bank. The component of the power signal associated with low midrange (250 Hz to 500 Hz) audio is separated into a low midrange bank. The component of the power signal associated with midrange (500 Hz to 2 kHz) audio is separated into a midrange bank. The component of the power signal associated with upper midrange (2 kHz to 4 kHz) audio is separated into an upper midrange bank. The component of the power signal associated with presence (4 kHz to 6 kHz) audio is separated into a presence bank. The component of the power signal associated with brilliance (6 kHz to 20 kHz) audio is separated into a brilliance bank. This each data component is associated with a respective frequency range. It is noted that while a full frequency range has been shown in FIG. 9, as subset of the full range may be used depending on the use case. For example, for narrow range applications, the brilliance and sub-bass banks may be discarded. For other applications, the low range (e.g. sub-bass and bass) banks may be discarded, or the high range banks (brilliance and presence) may be discarded, or wider banks may be used (e.g. sub-bass combined with bass, the midrange banks combined, presence combined with brilliance etc.), or narrower banks may be used. It will be appreciated that many permutations are possible depending on the use case.

The filter bank 93 is an exemplary implementation of the filter module 22 of FIG. 2.

Once the banks have been determined, each data component is passed to integration module 94 that performs a separate integration operation on each data component. The operation is a moving average integration across an integration window, and determines the envelope of the haptic drive signal across each frequency range. The envelope for a given frequency range is referred to herein as a haptic drive component. The moving average integration window may be either one period or a half-period of the actuators resonant frequency—i.e. $T=(1/F_0)$ or $T=(0.5/F_0)$. The integration operation for a data component may be expressed as follows:

$$p_{env}(t) = \int_{t-T}^{t} p_j(t)dt;$$

$$e_{env}(t) = \int_{t-T}^{t} e_j(t)dt; \text{ or}$$

$$p_{env}(t) = \int_{t-T}^{t} a_j(t)dt$$

depending on whether signal power p, or direct excursion e or acceleration a is being used. The period may be fixed for all frequency bands or may be set individually for each frequency band—e.g. each frequency band may have its own period. The period T may also be set to capture certain types of sounds. For example, a low frequency sound may require a longer integration period to ensure the signal power (i.e. excursion, acceleration or pressure) from that sound is captured in the envelope (a small period may only capture a portion of the signal, for example). For higher frequency sounds, smaller periods may be used.

Each haptic drive component $p_{env}(t)$ is then passed to a gating module 95 which applies a non-linear noise gating function, which may be controlled by a the graphic equalizer of FIG. 3. Here, a threshold, $Th_n$ and a gain, $G_n$, may be applied to each haptic drive component $p_{env}(t)_n$, where n is the particular frequency range associated with the haptic drive component. In other word, each haptic drive component is associated with its own threshold and gain. The threshold is used to eliminate outlier sub-components within an envelope—i.e. it acts as a smoothing function to eliminate artefacts in the signal. The gains are used to emphasize or deemphasize their respective haptic drive component and are controllable by a user. In some use cases, a user may also be given control of setting the thresholds, for example via the graphic equalizer of FIG. 3. For example, a standard mode may be provided in which only gains are selectable, and a separate advanced mode provided for technicians in which both the thresholds and the gains are selectable by the equalizer. It will be appreciated that in some embodiments thresholds are not used.

Integration module 94 and gating module 95 is an exemplary implementation of the envelope tracking module 23.

The gain adjusted haptic drive components are then recombined by a suitable operation into a full signal $p_{GA}(t)$ (which represents all the gain adjusted components) and passes to the modulator 96 which modulates the signal at the resonant frequency—here this can be expressed as $p_h(t)$ 32 $p_{GA}(t)*\sin(2\lambda F_0 t)$.

Modulator 96 is an exemplary implementation of the amplitude modulator 24 of FIG. 2.

Finally, the modulated signal $p_h(t)$ is passed to a waveform designer 97 which takes the modulated signal $p_h(t)$ (of $a_h(t)$) if acceleration is being used directly and generates the actuator drive voltage $u_h(t)$, shown in FIG. 9 by unit 98. Waveform designer 97 is an exemplary implementation of the waveform generator 25 of FIG. 2 and operates as described in relation to FIG. 2 and under the waveform generator heading.

It is noted that in the above, aspects of the disclosure have been discussed involving the use of frequency bands. However, embodiments are possible that do not use frequency bands. For example, spot conversions are possible, where certain sounds having a known audio waveform are converted to a haptic response in the temporal domain. Here, the audio-to-haptic conversion would follow the same principles as shown in FIG. 2—the audio waveform will be used to generate a consistent haptic response. However, here, no banking according to frequency is performed as the input audio signal will have a discrete waveform that can be converted to a consistent haptic response using aspects of this disclosure. For example, in gaming applications, a gunshot may have a certain waveform. The expected mechanical behavior of the speaker may be determined from this waveform, and from this a consistent haptic response can be generated, for example, by using the models and conversions discussed herein (but without the filter banking). Further, the haptic response may be varied—the generated haptic waveform—may be varied based on metrics such as who pulled the trigger (e.g. a different haptic response is generated if the user pulled the trigger or if another player pulled the trigger). This may be detected based on user input, or based on data retrieved from the game engine.

Example Application

One application of aspects of the present disclosure is to target haptic response for lower audio frequency banks, for example bass and sub-bass. The reason for this is that audio speakers often have sub-optimal performance in these lower frequency bands. For example, audio speakers of a mobile phone may not perform optimally in the bass and sub-bass ranges. Thus, by emphasizing the haptic response for these lower frequency ranges, the haptic response may supplement the audio in these lower ranges making the diminished performance of the speaker in these ranges less noticeable to the user. Here, there is both audio and haptic response at the low frequencies; the haptic response is complementing the audio response. An alternative is to combine the audio-to-haptic conversion discussed herein with psychoacoustic bass. In this approach, the audio speaker may in fact have no audio response at a fundamental frequency of a given low bass frequency. In this case, the speaker may play certain harmonic frequencies of the low bass frequency while the haptic actuator converts the missing fundamental frequency in the audio waveform to a haptic response. For example, a missing fundamental at 85 Hz, may be played back using the 2nd harmonic at 170 Hz and the 3rd harmonic at 255 Hz to the audio speaker whereas the fundamental 85 Hz would be converted from audio to haptic and played back on the haptic actuator. Here, the conversion may first derive (for example mathematically) the expected fundamental waveform from the harmonics, and then use the derived audio waveform of the fundamental to generate the haptic response, for example, as per the aspects described herein.

Figure 10:
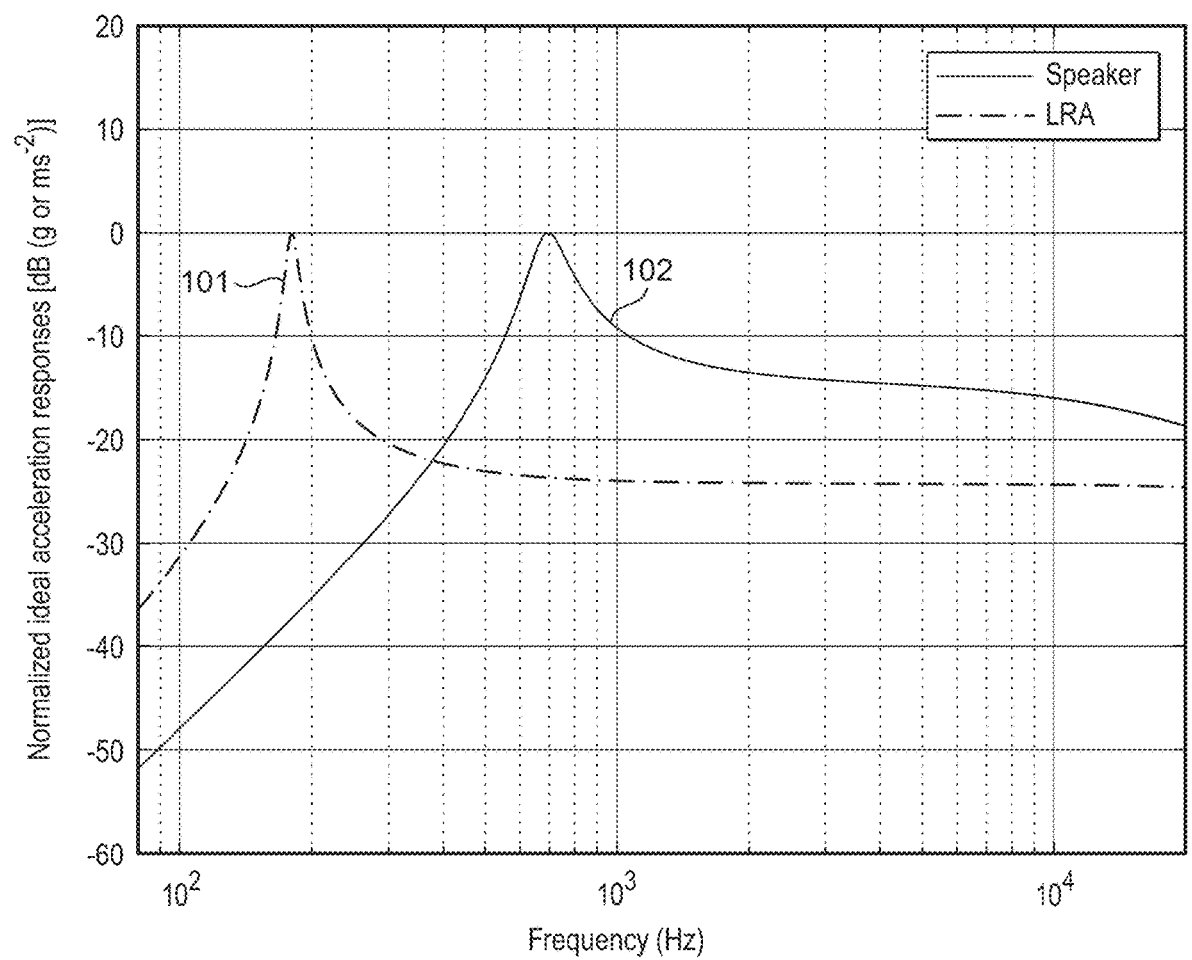
FIG. 10 is a graph illustrating an exemplary application of aspects of the disclosure.

FIG. 10 shows this principle in which a graph is provided illustrating increased actuator activation across a frequency having decreased audio activity. In particular, curve 101 shows actuator activity, illustrating that activity reaches its highest point between $10^2$ and $10^3$ Hz, in which the audio response 102 is low. Haptic actuator activity then decreases to low levels between $10^3$ and $10^4$ Hz where speaker activity reaches its highest point.

This haptic response is achieved by selection of appropriate gains, for example via the graphic equalizer of FIG. 3. For example, in the embodiment of FIG. 9, haptic drive components associated with the sub-bass and the bass frequency ranges may be provided with high gains—i.e. high gain values G1 and G2 may be selected, and gains of zero or close to zero are selected for the remaining haptic drive components. This, in the gain adjusted signal, the low frequency haptic drive components are emphasized and the remaining components are suppressed. When converted into the final voltage drive signal, the emphasized low frequency components will be converted into a larger drive signal, and thus will produce greater activity in the haptic actuator for this audio frequency range. In other words, low frequency audio components of the audio signal will result in a large acceleration of the haptic actuator—they will be converted into emphasized haptic drive components.

It will be appreciated that for other applications gains can be tailored differently so as to achieve different haptic responses.

Aspects of the disclosure have application in a wide variety of use cases, for example in mobile phones, wearables, virtual reality, gaming and IOT devices. Applications include audio-synchronous haptics, gaming vibrations such as gun-shots, bomb-blasts and car engines, app alerts, ringtones, and notifications that involve both audio and haptics, and audio and or video playback with haptic response, for example, a user watching a video and/or listening to audio content on the mobile device for purposes of immersive experience, tracking wireless headset latency, e.g., Bluetooth latency, and account for the playback with e.g. speakers attached to your glasses or frames or other headsets (using micro speakers) etc.

Advantages include improved haptic waveform generation—i.e. the waveform is more appropriate to the audio signal and to the properties of both speaker and actuator; improved timing synchronization between audio and haptic output and improved bass perception on e.g. handheld devices.

The invention claimed is:

1. A method for haptic drive signal generation, the method comprising:
   receiving an input audio signal for driving an audio speaker;
   deriving, from the input audio signal, data components indicative of a mechanical acceleration of the audio speaker when being driven by the input audio signal, each data component being associated with a respective frequency range;

determining a haptic drive component from each data component derived from the input audio signal;

selecting a respective gain to provide to each of the haptic drive components, each respective gain being selected for each respective frequency range associated with each respective data component derived from the input audio signal;

applying each selected gain to the respective haptic drive component to produce gain adjusted haptic drive components; and determining a haptic drive signal from the gain adjusted haptic drive components, the haptic drive signal being so as to produce a mechanical behavior of a haptic actuator when the haptic drive signal is used to drive the haptic actuator.

2. The method of claim 1, wherein each data component is indicative of the mechanical acceleration of the audio speaker when being driven by the input audio signal across the respective frequency range.

3. The method of claim 2, wherein deriving the data components comprises:

predicting the mechanical acceleration of the audio speaker when being driven by the input audio signal; and determining the data components from the prediction of the mechanical acceleration.

4. The method of claim 3, wherein the predicting comprises inputting the input audio signal into a model of the mechanical acceleration of the audio speaker, the model configured to generate a prediction of the mechanical acceleration of the audio speaker when driven by the audio signal input into the model.

5. The method of claim 4, wherein the predicting further comprises adjusting one or more parameters of the model based on operational feedback from the audio speaker.

6. The method of claim 5, wherein the operational feedback comprises voltage, current feedback from the audio speaker, or both.

7. The method of claim 3, wherein determining the data components from the prediction of the mechanical acceleration comprises filtering the prediction of the mechanical acceleration according to audio frequency, the prediction of the mechanical acceleration being filtered into the data components.

8. The method of claim 1, wherein determining a haptic drive component from each data component comprises applying a moving average to each data component to produce a respective haptic drive component.

9. The method of claim 1, wherein the respective gain to provide to each of the haptic drive components is selectable by a user.

10. The method of claim 9, wherein the respective gain to provide to each of the haptic drive components is selectable by a user through a graphical user interface, GUI.

11. The method of claim 1, wherein each haptic drive component is indicative of a mechanical behavior of the haptic actuator when driven by the haptic drive signal determined from the respective haptic drive component.

12. The method of claim 11, wherein determining the haptic drive signal from the gain adjusted haptic drive components comprises:

determining, from the gain adjusted haptic drive components, the haptic drive signal to produce the mechanical behavior of the haptic actuator indicated by the gain adjusted haptic drive components.

13. The method of claim 12, wherein determining, from the gain adjusted haptic drive components, the haptic drive signal comprises:

amplitude modulating a tone at a resonant frequency of the haptic actuator with the gain adjusted haptic drive components to produce a modulated signal; and inputting the modulated signal into a model of the mechanical behavior of the haptic actuator, the model configured to generate the haptic drive signal that will recreate the mechanical behavior indicated by the modulated signal when the haptic drive signal is used to drive the haptic actuator.

14. The method of claim 13, wherein determining, from the gain adjusted haptic drive components, the haptic drive signal further comprises adjusting one or more parameters of the model based on operational feedback from the haptic actuator.

15. The method of claim 14, wherein the operational feedback comprises voltage, current feedback from the haptic actuator, or both.

16. The method of claim 1, further comprising providing gains to the haptic drive components based on the frequency ranges associated with the haptic drive components.

17. The method of claim 16, wherein a first haptic drive components is associated with a first frequency range component and a second haptic drive component associated with a second frequency range, the first frequency range being a lower frequency range than the second frequency range, and wherein providing gains to the haptic drive components based on the frequency ranges associated with the haptic drive components comprises providing a higher gain to the first haptic drive component associated with the first frequency range component than the gain provided to the second haptic drive component associated with the second frequency range.

18. The method of claim 17, wherein gain provided to the second haptic drive component may be is a zero gain.

19. The method of claim 1, further comprising:

synchronizing an audio output of the audio speaker with a haptic output of the haptic actuator, the synchronizing comprising:

generating the audio output from the audio speaker using a pilot input signal and receiving a speaker response signal from the audio speaker in response to the generated audio output;

generating the haptic output from the haptic actuator using a pilot input signal and receiving a haptic response signal from the haptic actuator in response to the generated haptic output;

determining a time-delay from the speaker response signal and the haptic response signal; and adjusting input audio signals to the audio speaker and input haptic signals to the haptic actuator so as to adjust the time-delay.

20. The method of claim 1, comprising:

outputting both the input audio signal to drive the audio speaker and the haptic drive signal to drive the haptic actuator that is separate from the audio speaker, wherein the haptic drive signal is based at least in part on the mechanical acceleration of the audio speaker when being driven by the input audio signal.

21. A system for haptic drive signal generation comprising one or more processors configured to:

receive an input audio signal for driving an audio speaker;

derive, from the input audio signal, data components indicative of a mechanical acceleration of the audio speaker when being driven by the input audio signal, each data component being associated with a respective frequency range;

determine a haptic drive component from each data component derived from the input audio signal;

select a respective gain to provide to each of the haptic drive components, each respective gain being selected for each respective frequency range associated with each respective data component derived from the audio signal;

apply each selected gain to the respective haptic drive component to produce gain adjusted haptic drive components; and determine a haptic drive signal from the gain adjusted haptic drive components, the haptic drive signal being so as to produce a mechanical behavior of a haptic actuator when the haptic drive signal is used to drive the haptic actuator.

22. The system of claim 21, wherein each data component is indicative of the mechanical acceleration of the audio speaker when being driven by the input audio signal across the respective frequency range.

23. The system of claim 22, wherein deriving the data components comprises:
predicting the mechanical acceleration of the audio speaker when being driven by the input audio signal; and
determining the data components from the prediction of the mechanical acceleration.

24. The system of claim 23, wherein the predicting comprises inputting the input audio signal into a model of the mechanical acceleration of the audio speaker, the model configured to generate a prediction of the mechanical acceleration of the audio speaker when driven by the audio signal input into the model.

25. The system of claim 24, wherein the predicting further comprises adjusting one or more parameters of the model based on operational feedback from the audio speaker.

26. The system of claim 25, wherein the operational feedback comprises voltage, current feedback from the audio speaker, or both.

27. The system of claim 23, wherein determining the data components from the prediction of the mechanical acceleration comprises filtering the prediction of the mechanical acceleration according to audio frequency, the prediction of the mechanical acceleration being filtered into the data components.

28. The system of claim 21, wherein determining a haptic drive component from each data component comprises applying a moving average to each data component to produce a respective haptic drive component.

29. The system of claim 21, wherein the respective gain to provide to each of the haptic drive components is selectable by a user.

30. The system of claim 29, wherein the respective gain to provide to each of the haptic drive components is selectable by a user through a graphical user interface, GUI.

31. The system of claim 21, wherein each haptic drive component is indicative of the mechanical behavior of the haptic actuator when driven by the haptic drive signal determined from the respective haptic drive component.

32. The system of claim 31, wherein determining the haptic drive signal from the gain adjusted haptic drive components comprises:
determining, from the gain adjusted haptic drive components, the haptic drive signal to produce the mechanical behavior of the haptic actuator indicated by the gain adjusted haptic drive components.

33. The system of claim 32, wherein determining, from the gain adjusted haptic drive components, the haptic drive signal comprises:
amplitude modulating a tone at a resonant frequency of the haptic actuator with the gain adjusted haptic drive components to produce a modulated signal; and
inputting the modulated signal into a model of the mechanical behavior of the haptic actuator, the model configured to generate the haptic drive signal that will recreate the mechanical behavior indicated by the modulated signal when the haptic drive signal is used to drive the haptic actuator.

34. The system of claim 33, wherein determining, from the gain adjusted haptic drive components, the haptic drive signal further comprises adjusting one or more parameters of the model based on operational feedback from the haptic actuator.

35. The system of claim 34, wherein the operational feedback comprises voltage, current feedback from the haptic actuator, or both.

36. The system of claim 21, wherein the one or more processors are further configured to provide gains to the haptic drive components based on the frequency ranges associated with the haptic drive components.

37. The system of claim 36, wherein a first haptic drive components is associated with a first frequency range component and a second haptic drive component associated with a second frequency range, the first frequency range being a lower frequency range than the second frequency range, and wherein providing gains to the haptic drive components based on the frequency ranges associated with the haptic drive components comprises providing a higher gain to the first haptic drive component associated with the first frequency range component than the gain provided to the second haptic drive component associated with the second frequency range.

38. The system of claim 37, wherein gain provided to the second haptic drive component may be is a zero gain.

39. The system of claim 21, wherein the one or more processors are further configured to:
synchronize an audio output of the audio speaker with a haptic output of the haptic actuator, wherein, to synchronize the audio output, the one or more processors are further configured to generate the audio output from the audio speaker using a pilot input signal and receiving a speaker response signal from the audio speaker in response to the generated audio output;
generate the haptic output from the haptic actuator using a pilot input signal and receiving a haptic response signal from the haptic actuator in response to the generated haptic output;
determine a time-delay from the speaker response signal and the haptic response signal; and
adjust input audio signals to the audio speaker and input haptic signals to the haptic actuator so as to adjust the time-delay.

40. The system of claim 21 further comprising a memory connected to the one or more processors.

41. The system of claim 21 further comprising the audio speaker, the haptic actuator, or both being connected to the one or more processors.

42. A non-transitory computer-readable medium comprising instructions that when executed cause one or more circuits of a device for processing data to carry out the method steps of any one of claims 1 to 19.

\* \* \* \* \*